Inventor
C.W. EARP
By Philip M. Bolton
Attorney

March 19, 1957 C. W. EARP 2,786,100

PULSE COMMUNICATION SYSTEMS

Filed Nov. 23, 1951 15 Sheets-Sheet 2

Inventor
C. W. EARP
By Philip M. Bolton
Attorney

March 19, 1957 C. W. EARP 2,786,100

PULSE COMMUNICATION SYSTEMS

Filed Nov. 23, 1951 15 Sheets-Sheet 3

Inventor
C.W.EARP
By Philip M. Bolton
Attorney

Inventor
C. W. EARP
By Philip M. Bolton
Attorney

Inventor
C.W. EARP
By Philip M. Bolton
Attorney

March 19, 1957 C. W. EARP 2,786,100

PULSE COMMUNICATION SYSTEMS

Filed Nov. 23, 1951 15 Sheets-Sheet 6

Inventor
C.W. EARP
By Philip M. Bolton
Attorney

Inventor
C.W. EARP
By Philip M. Bolton
Attorney

March 19, 1957 C. W. EARP 2,786,100

PULSE COMMUNICATION SYSTEMS

Filed Nov. 23, 1951 15 Sheets-Sheet 8

Inventor
C.W.EARP
By Philip M. Bolton
Attorney

Inventor
C.W. EARP
By Philip M. Bolton
Attorney

Inventor
C.W. EARP
By Philip M. Bolton
Attorney

Inventor
C. W. EARP
By Philip M. Bolton
Attorney

March 19, 1957 C. W. EARP 2,786,100

PULSE COMMUNICATION SYSTEMS

Filed Nov. 23, 1951

15 Sheets-Sheet 12

Inventor
C.W. EARP
By Philip M. Bolton
Attorney.

Inventor
C.W. EARP
By Philip M. Bolton
Attorney

Inventor
C.W. EARP
By Philip M. Bolton
Attorney.

March 19, 1957 C. W. EARP 2,786,100

PULSE COMMUNICATION SYSTEMS

Filed Nov. 23, 1951 15 Sheets-Sheet 15

Inventor
C.W.EARP
By Philip M. Bolton
Attorney.

United States Patent Office 2,786,100

Patented Mar. 19, 1957

2,786,100

PULSE COMMUNICATION SYSTEMS

Charles William Earp, London, England, assignor to International Standard Electric Corporation, New York, N. Y., a corporation of Delaware Application November 23, 1951, Serial No. 257,807

Claims priority, application Great Britain December 1, 1950

23 Claims. (Cl. 179—15)

Figure 1:
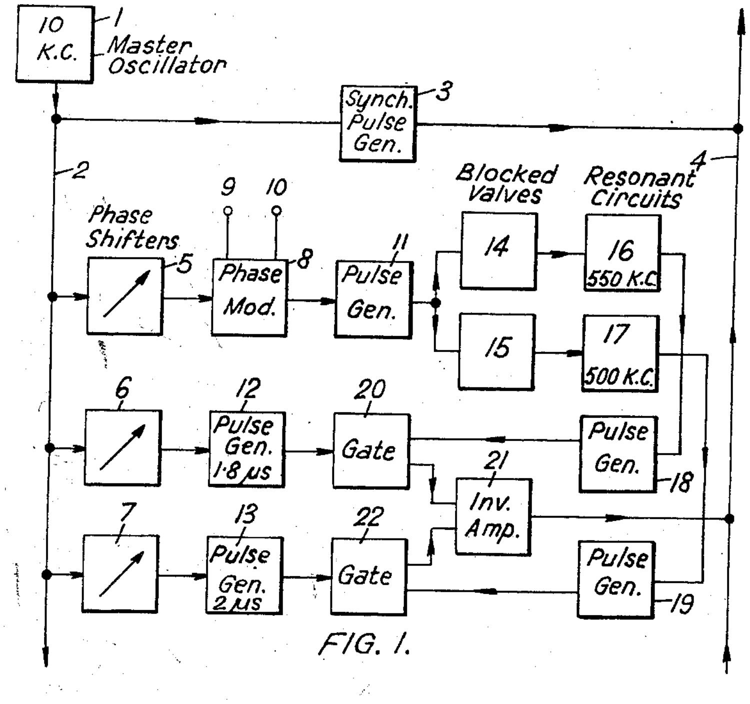

The present invention relates to electric signal communication systems of the kind in which a signal wave is sampled at frequent intervals at the transmitter and information regarding some characteristic of each sample is conveyed to the receiver, from which information the signal wave is reconstructed.

In radio communication systems, much attention has been directed in recent years to improving the signal-to-noise ratio within the limitations imposed by the transmitter power, the frequency bandwidth available, and the amount of information which must be transmitted within a given time. The latter factor is determined partly by the nature of the signal to be conveyed, and partly by the number of channels which have to be provided.

These considerations have suggested the use of short electric pulses as carriers for the signal wave, and hitherto three principal lines of development have been followed, namely (*a*) Pulse position modulation systems, in which each signal amplitude sample is represented by the time displacement of a pulse from a mean time position;

(*b*) Pulse code modulation systems, in which each sample is quantised and the quantised value is conveyed to the receiver by pulses according to a code;

(*c*) Pulsed frequency modulation systems in which short pulses or packets of frequency modulated wave-trains are transmitted to the receiver, each pulse representing a sample of the signal wave.

Concerning system (*b*), it should be explained that by "quantising" we mean a process at the transmitter whereby the amplitude or other function such as change of amplitude, of the sample is effectively measured with respect to a scale having a finite number of steps, whereby the nearest step of the scale corresponding to the sample is determined. The number designating the step is subsequently expressed in the form of a pulse code.

Of these three systems the pulse code modulation system has so far been found to be capable of giving the best performance as regards signal-to-noise ratio, other things being equal, but part of the advantage is gained at the expense of signal distortion which is inherent in the quantising process, since the accuracy with which the signal wave can be reproduced is limited by the magnitude of the steps of the amplitude scale.

Concerning now the choice of the code, it is to be noted that if there are $n$ code elements or digits, and each digit can indicate $m$ different values of some parameter, the total number of amplitude steps which can be represented by the code is $m^n$. It has been found impracticable to employ a code in which $m$ has a value greater than 2, which corresponds to a binary code, and so in order to reduce the inherent distortion to within tolerable limits for a commercial speech transmission system, at least 6 digits must be used. The necessary equipment for quantising, coding, and decoding in a 6-digit system is very complicated and expensive.

It should be pointed out that effectively a separate communication channel is required to transmit each digit of a pulse code modulation system, so that in a 6-digit system each speech signal requires six separate pulse channels for its conveyance. In theory of course, the information regarding each digit could be conveyed to the receiver over any type of channel, in which the indicating parameter is not necessarily the amplitude or time position of a pulse.

The present invention is directed to the production of a system of communication which gives a better overall performance than a pulse code modulation system, in which no quantising process is employed, whereby no inherent signal distortion is produced, and which can be realised in practice by much simpler and cheaper equipment than can a pulse code modulation system.

According to the present invention, there is provided an electric communication system comprising at a transmitter, means for periodically sampling a signal wave, means for deriving from each sample a plurality of indices each representing on a continuous scale the same function of that sample, but at least one of said indices representing the said function ambiguously, and means for transmitting said indices by signals of such nature that the signal sample can be reconstituted therefrom unambiguously on a continuous scale.

By "index" we mean a quantity or parameter, such for example as the time displacement of a pulse, or the frequency of a wave, which can indicate the magnitude of some function of a signal sample. By "ambiguously" we mean that any one value indicated by the index corresponds to more than one value of the function.

The system according to the present invention is in some respects like a code system, and the "indices" correspond in a certain sense to code signals in that two or more of them are utilised at the receiver for reconstituting the signal sample. But here the resemblance ends because there is no quantising of the sample, since all the indices which are employed represent the sample according to a continuous scale, that is, they are not restricted to a limited number of values. It is for this reason that it becomes practicable to represent the signal sample accurately by the use of not more than two indices, and it is from this circumstance the simplification of the apparatus results. Thus in the preferred embodiments of the invention, two different indices are used, though three or more could be employed, if desired.

The significance of the ambiguity principle on which the present invention depends may be explained as follows: For clearness a particular system of transmission will be assumed, namely a pulse position modulation system, but the same ideas are applicable, mutatis mutandis, to other forms of transmission.

In a pulse position modulation system, assuming a given transmitted power, the signal-to-noise ratio may be increased as much as desired by increasing the time excursion of the pulse for a given signal amplitude. However the possible increase in time excursion of the transmitted pulse is limited by two factors, namely (*a*) The pulse repetition frequency, which is determined by the character of the signal to be transmitted; and (*b*) The number of channels to be provided in the case of a multi-channel system.

In conventional multichannel systems, the maximum practicable time excursion of the transmitted pulse is already employed, and so no further gain is possible in signal-to-noise ratio.

According to the ambiguity principle, however, each channel is represented by a train of initial pulses modulated so that the time excursion is, say, ten times that permissible according to the conventional system. However, these intial pulses are not transmitted, but each of them is represented by a transmitted pulse whose time excursion is within the limits imposed by the above stated conditions (*a*) and (*b*). This is possible if each time position of the transmitted pulse represents any one of a series of different time positions of the initial pulse, and if by some means the resulting ambiguity can be resolved.

This resolution is accomplished by the use of a second transmitted pulse which also represents the same time position of the initial pulse in an alternative manner.

The two transmitted pulses are employed at the receiver to reproduce a pulse having the time position of the initial pulse without ambiguity, and provided that a suitable technique is employed, the noise which accompanies the reproduced pulse can be substantially that which normally accompanies only one of the two transmitted pulses, the effect of the noise accompanying the other pulse being eliminated. In some cases, the technique adopted at the receiver may be so chosen that the pulse reproduced from two or more transmitted pulses has a time position which has a deviation due to noise which is the mean of the noise deviations of the transmitted pulses, so that the signal-to-noise power ratio is multiplied by the number of transmitted pulses which are used to characterise each reproduced pulse. Since the time excursion of the reproduced pulse is ten times greater than that permissible for the transmitted pulses, the signal-to-noise ratio will be increased by about 20 decibels.

Attention is drawn to the fact that the pulsed frequency modulation system (*c*) mentioned above, as practised hitherto, does not give any great advantage as regards signal-to-noise ratio, but this system, if the transmitter is suitably designed in the manner to be explained later, becomes a particular case of the present invention, and the same advantage as regards signal-to-noise ratio can be obtained. This may be done, for example by providing that each transmitted pulse contains the phase of the carrier wave as the ambiguous index, while the frequency is the second index by means of which the ambiguity may be resolved. In the system as hitherto practised, the phase index cannot be made use of, and no particular advantage can be obtained from the unambiguous frequency index.

It should be understood that when in this specification the "phase" of a wave is used as an index it is always the relative phase with respect to some standard of phase, which is meant. The comparison standard will often be the phase of the waves in a preceding pulse or section of waves, but it might be the phase of the waves produced by a master oscillator used as a basic standard for synchronising or controlling the whole system. This point will become more clear when embodiments employing a phase index are described.

It ought to be explained that the significant improvement in signal-to-noise ratio resulting from the application of the principles of the invention can only be obtained if the noise to which the signals are subjected is only moderately high. If the noise is very bad, no advantage can be obtained. This limitation is not peculiar to the present system, but applies to all the known arrangements for improving the signal-to-noise ratio. It can be shown that when the power at the receiver corresponding to the noise is of the same order as the received signal power, no system can give better results than an ordinary amplitude modulation carrier wave system employing a single sideband, with suppressed carrier.

The limitation stated above is actually not of any practical importance, because reliable commercial communiction is only possible by any system when the noise conditions are fairly good. In such circumstances the present invention enables a large increase in signal-to-noise ratio to be obtained, as compared with what is possible under equivalent conditions with the known systems.

Five principal embodiments will be described to illustrate various aspects of the invention, with reference to the accompanying drawings, as follows:

*1st embodiment*

Figure 5:
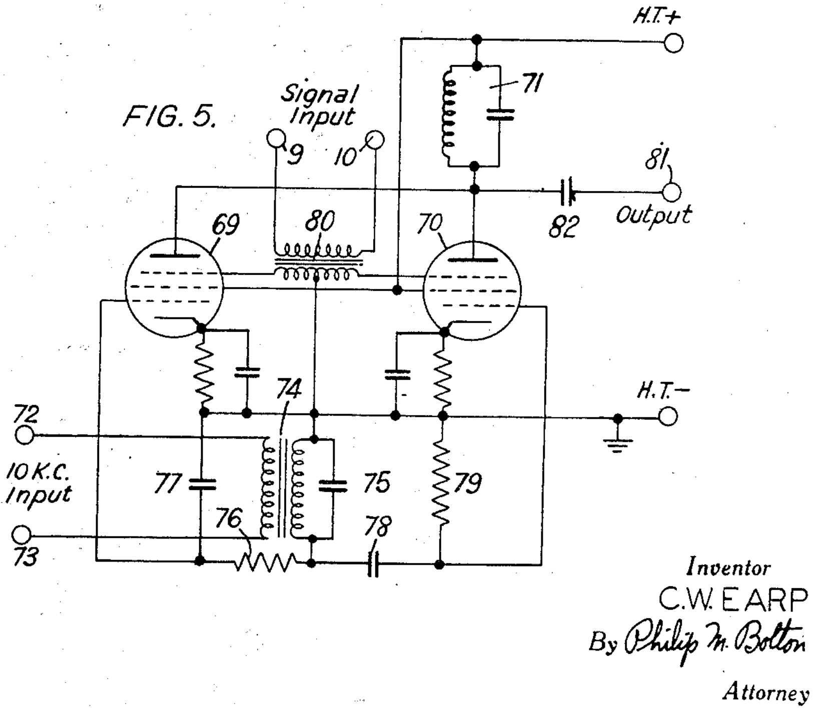
Figure 2:
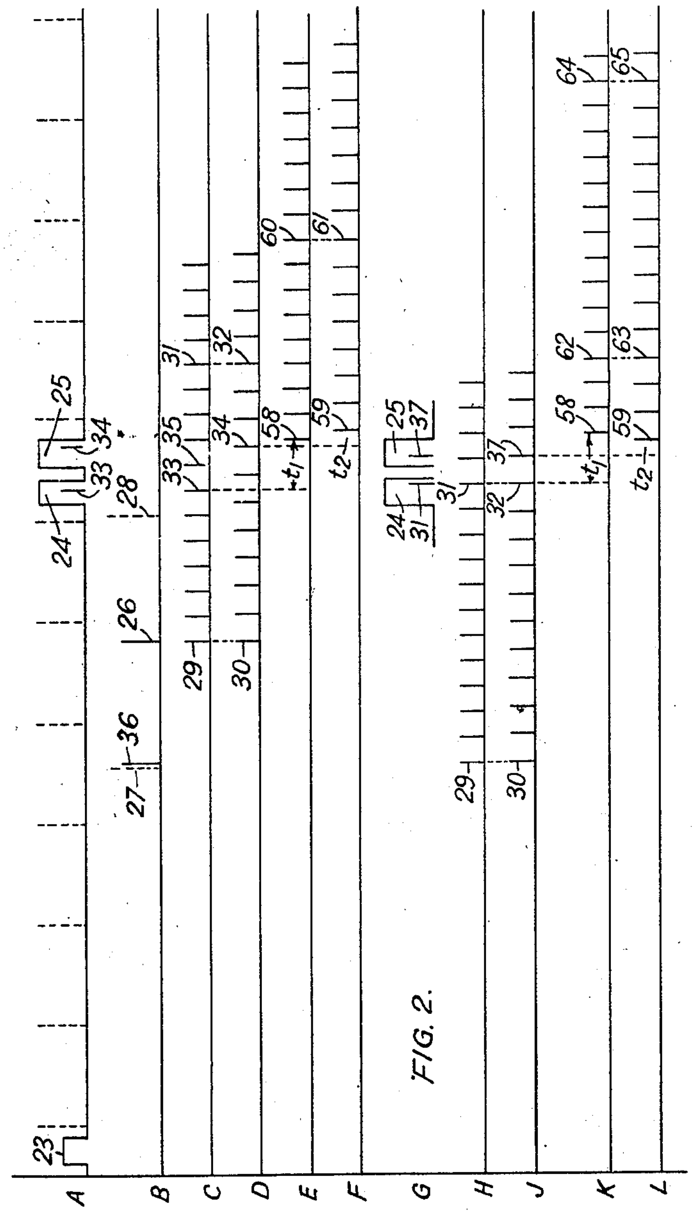
Figure 3:
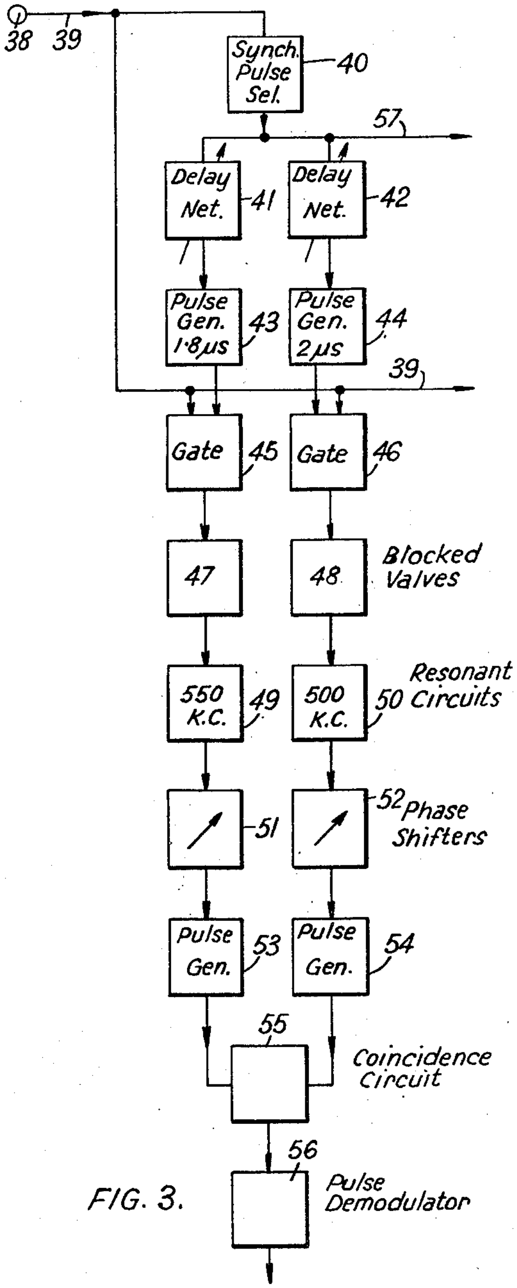
Figure 6:
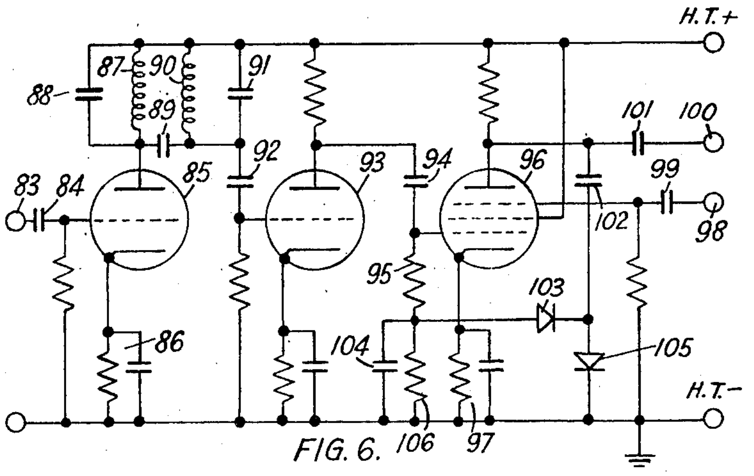
Figure 4:
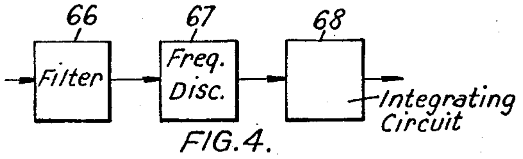

Fig. 1: Block schematic circuit of transmitter.
Fig. 2: Graphical diagrams illustrating the operation.
Fig. 3: Block schematic circuit of receiver.
Fig. 4: Block schematic circuit of preferred pulse demodulator used in Fig. 3.
Figs. 5 and 6: Detailed circuits of certain elements of Fig. 1.

*2nd embodiment*

Figure 7:
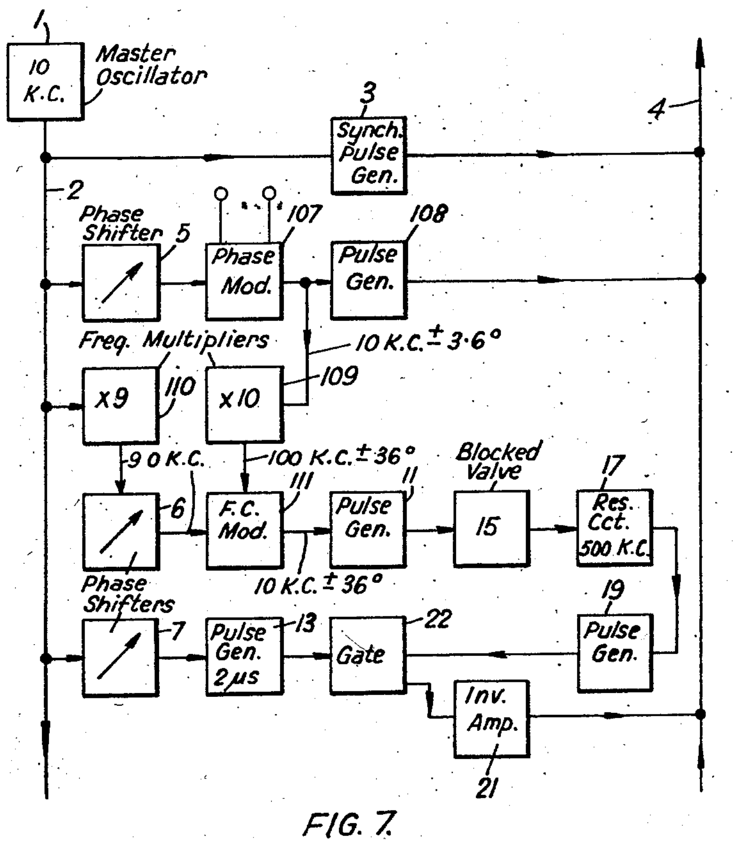
Figure 8:
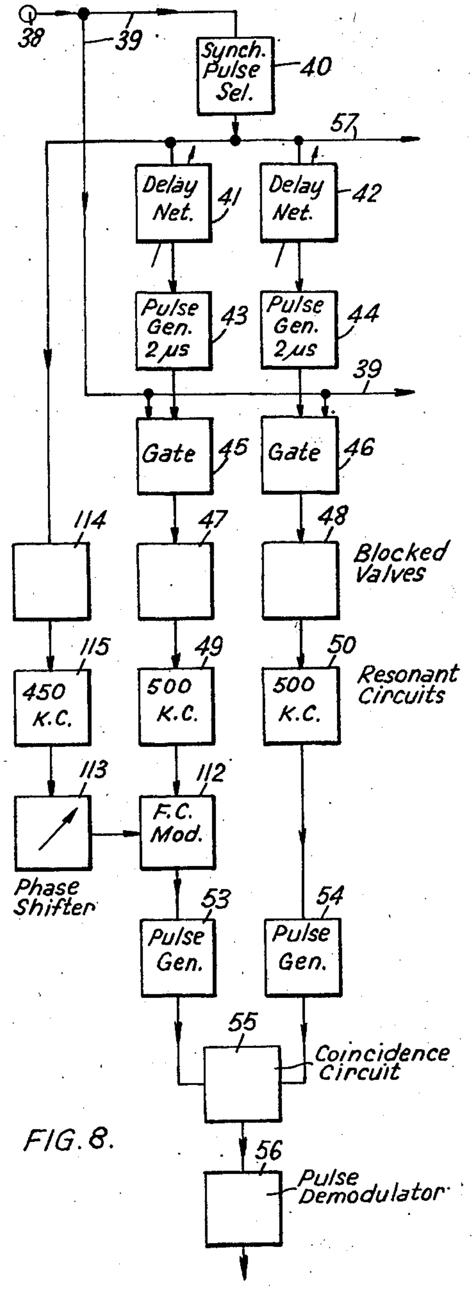
Figure 9:
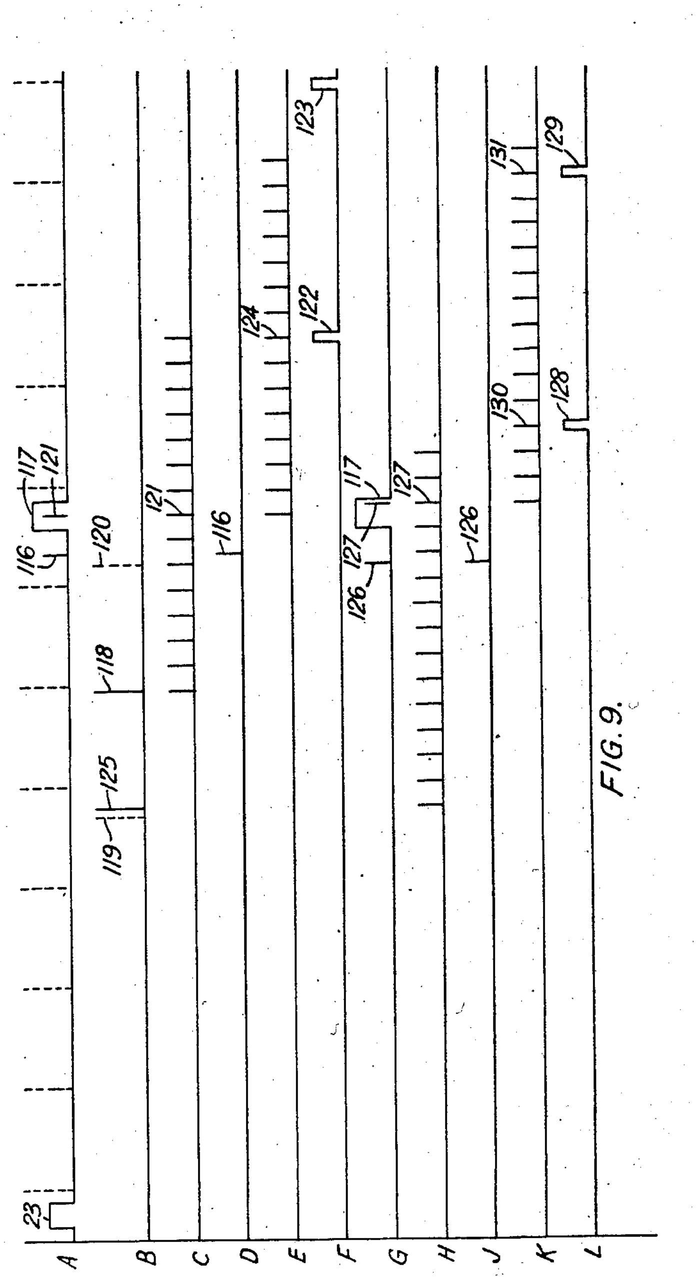

Fig. 7: Block schematic circuit of transmitter.
Fig. 8: Block schematic circuit of receiver.
Fig. 9: Graphical diagrams illustrating the operation.

*3rd embodiment*

Figure 12:
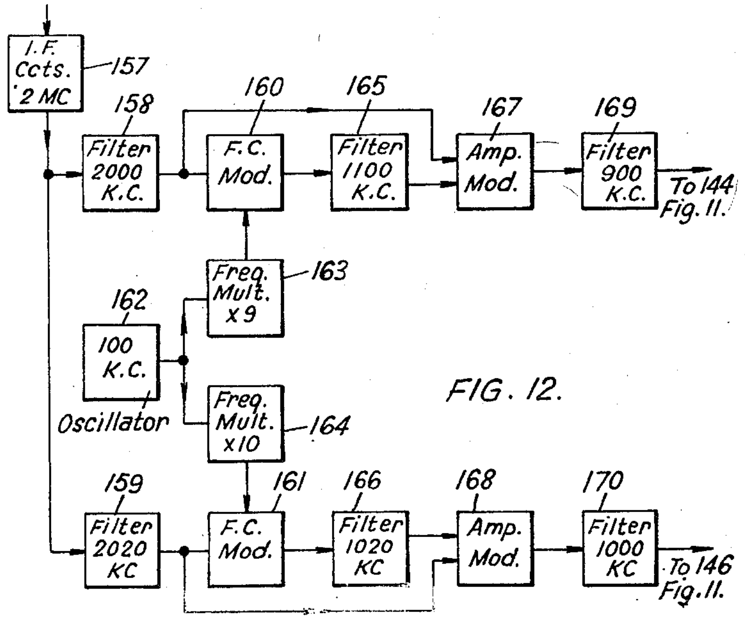
Figure 10:
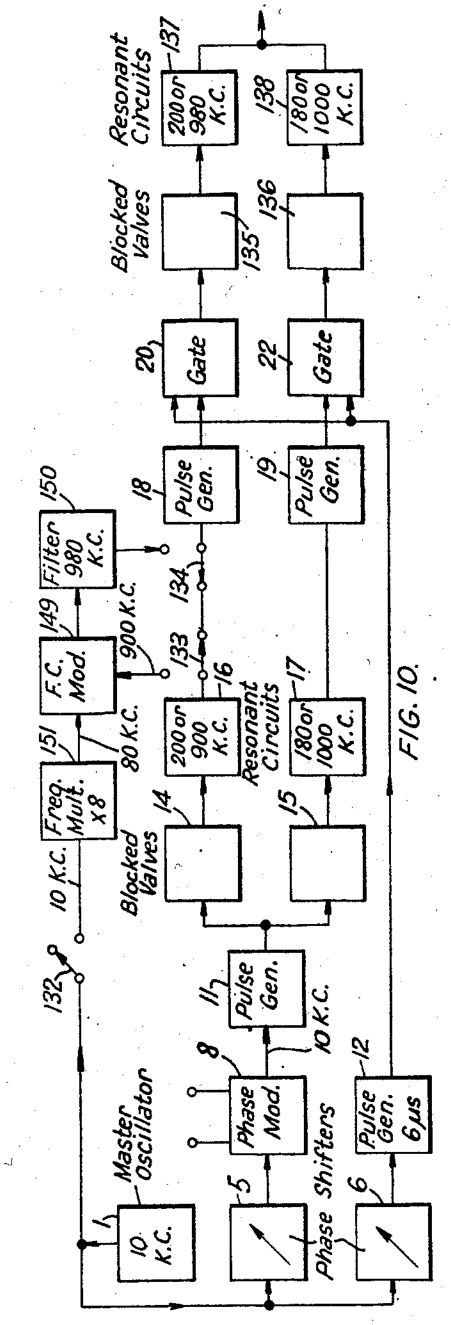
Figure 11:
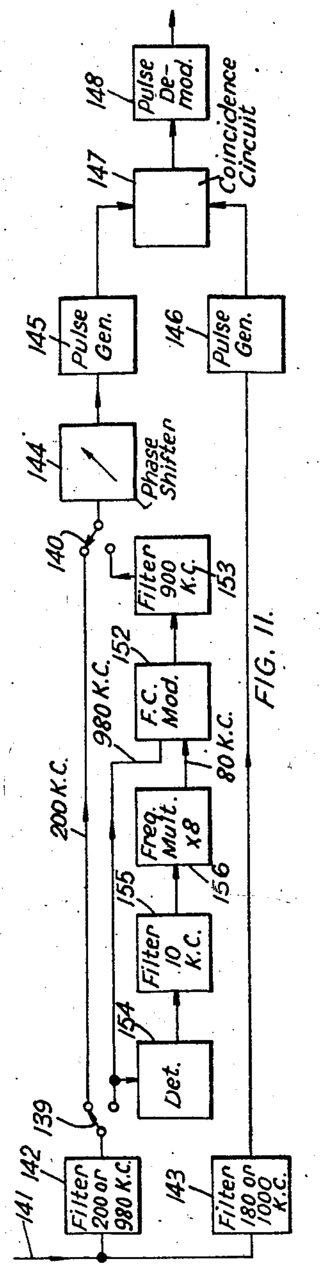
Figure 13:
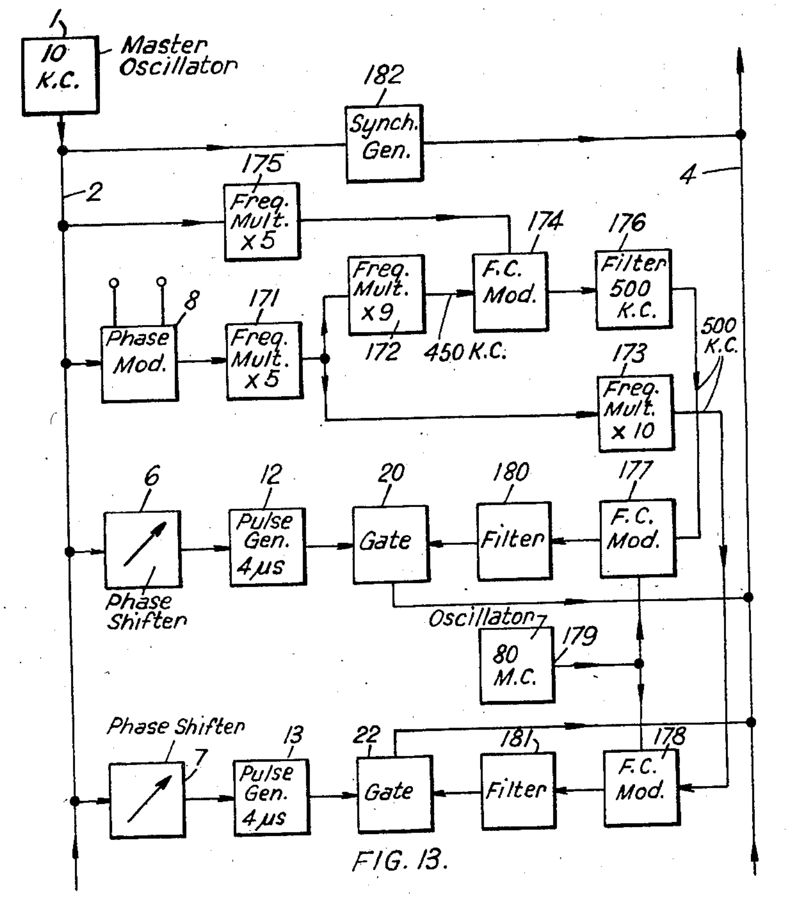
Figure 14:
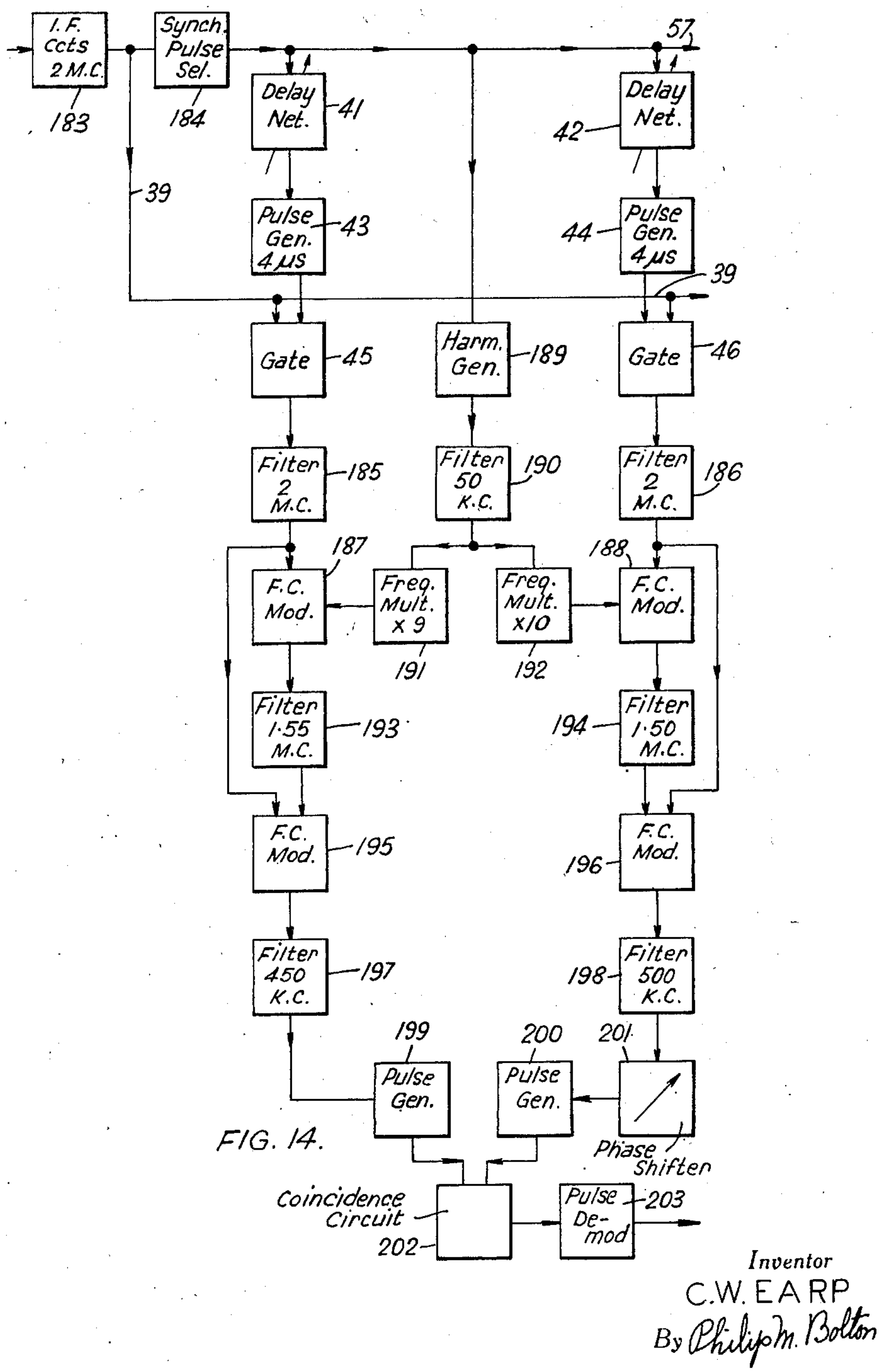

Fig. 10: Block schematic circuit of transmitter designed for frequency division multiplex.
Fig. 11: Block schematic circuit of corresponding receiver.
Fig. 12: Block schematic circuit of alternative receiver.
Fig. 13: Block schematic circuit of transmitter designed for time division multiplex.
Fig. 14: Block schematic circuit of corresponding receiver.

*4th embodiment*

Figure 16:
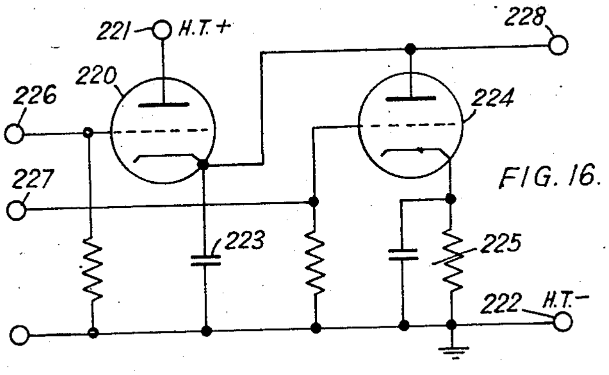
Figure 15:
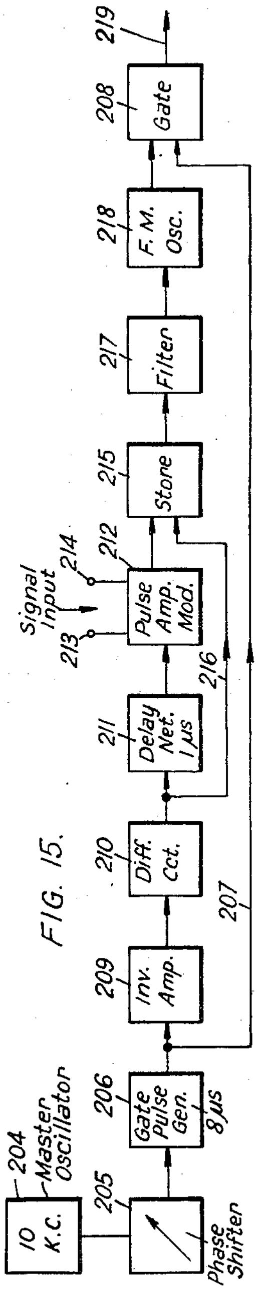
Figure 17:
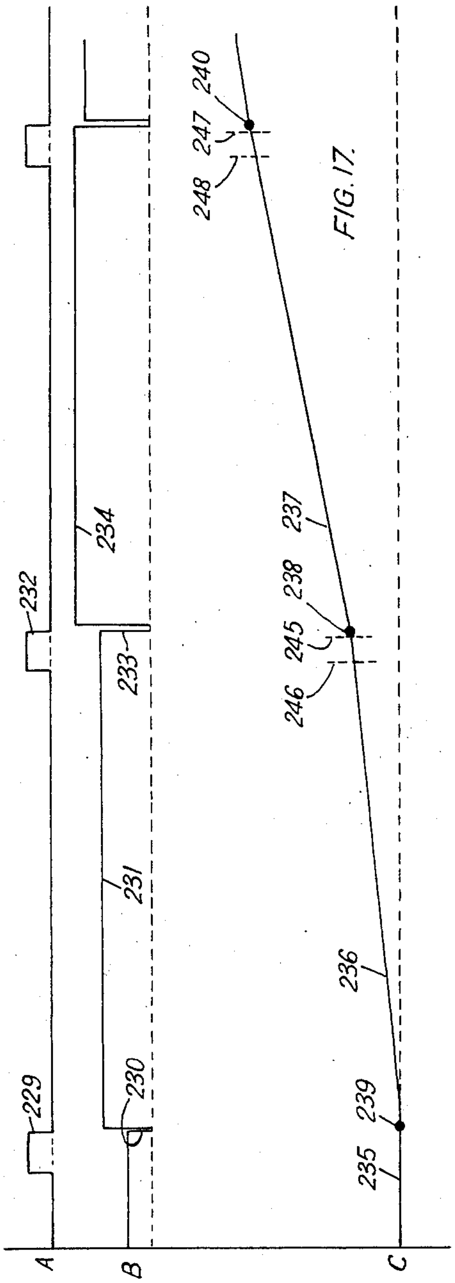
Figure 18:
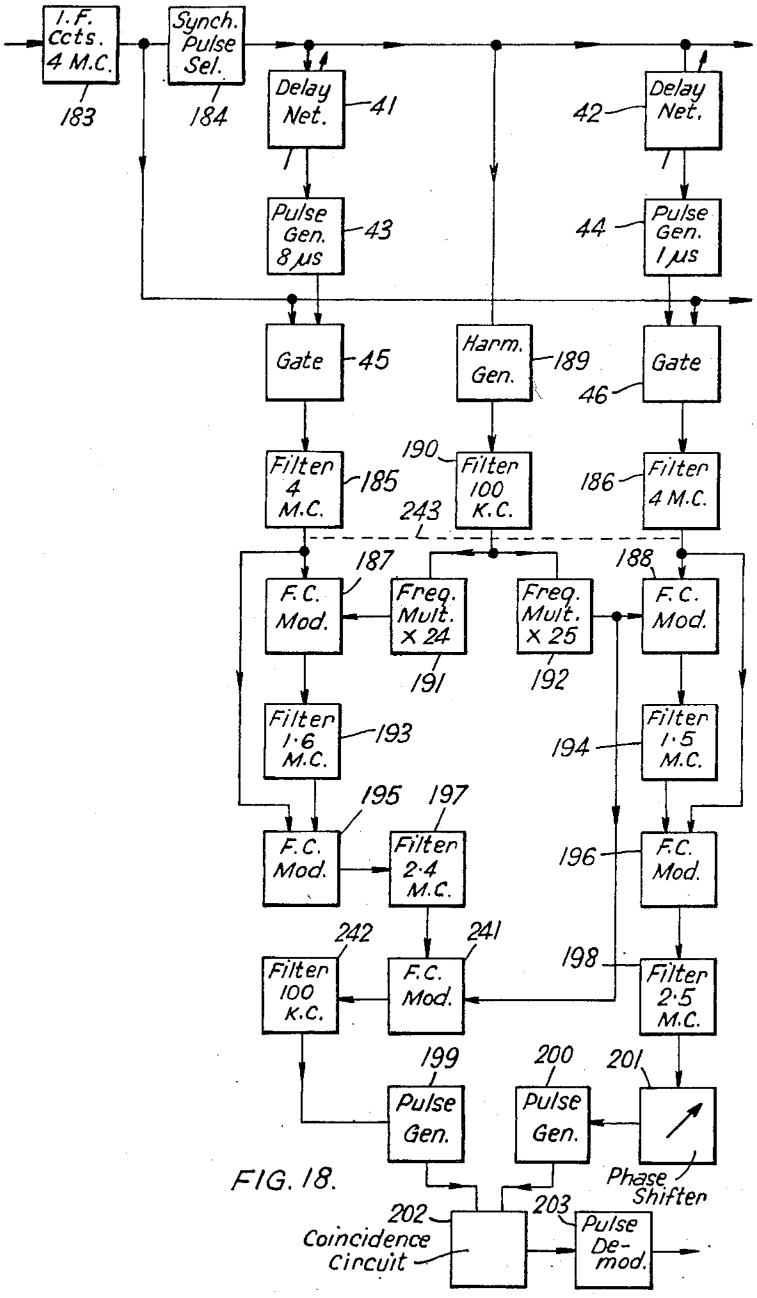
Figure 19:
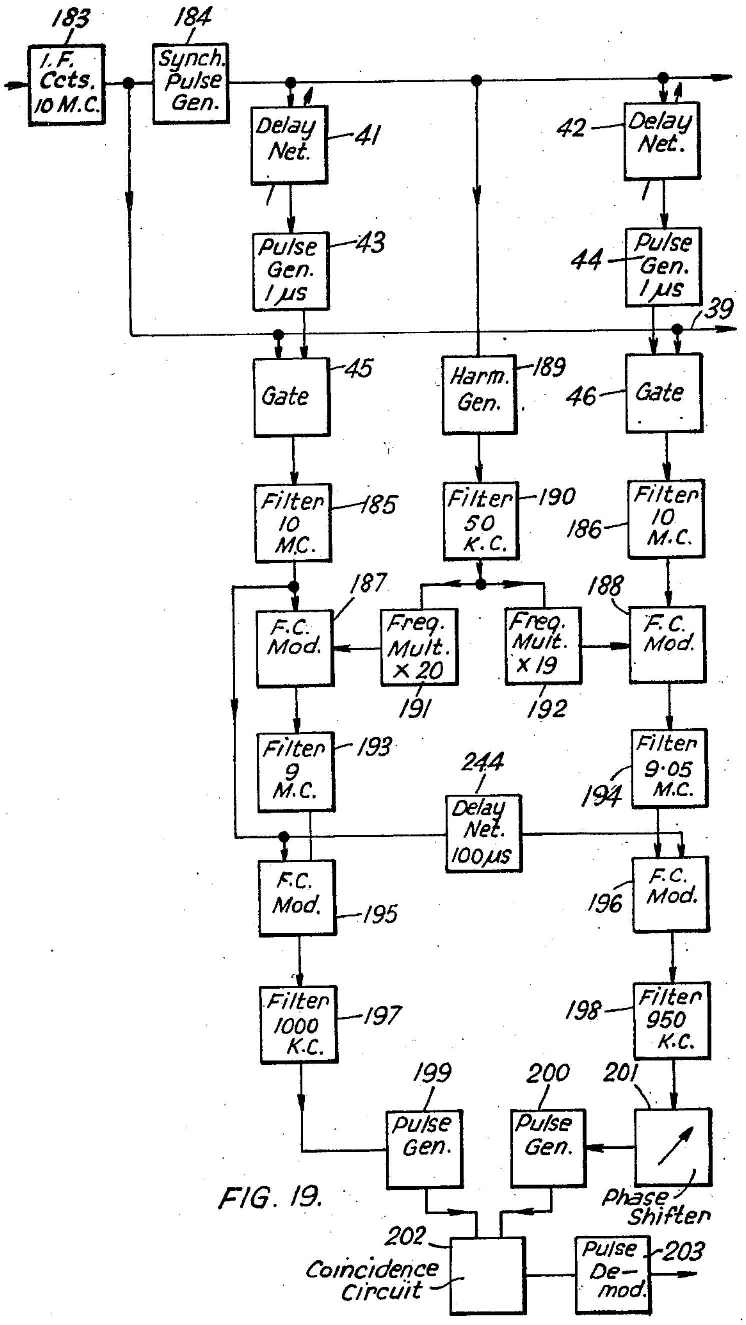

Fig. 15: Block schematic circuit of transmitter.
Fig. 16: Detailed circuit of an element of Fig. 15.
Fig. 17: Graphical diagrams illustrating the operation.
Fig. 18: Block schematic circuit of receiver.
Fig. 19: Block schematic circuit of alternative receiver.

*5th embodiment*

Figure 20:
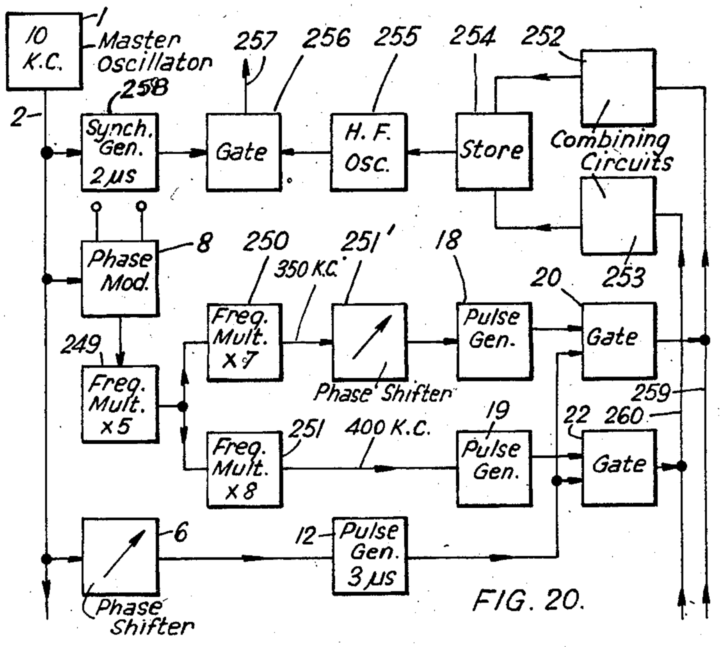
Figure 21:
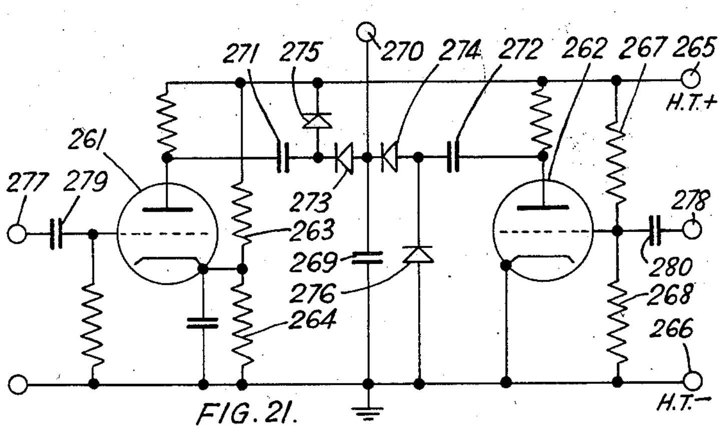
Figure 22:
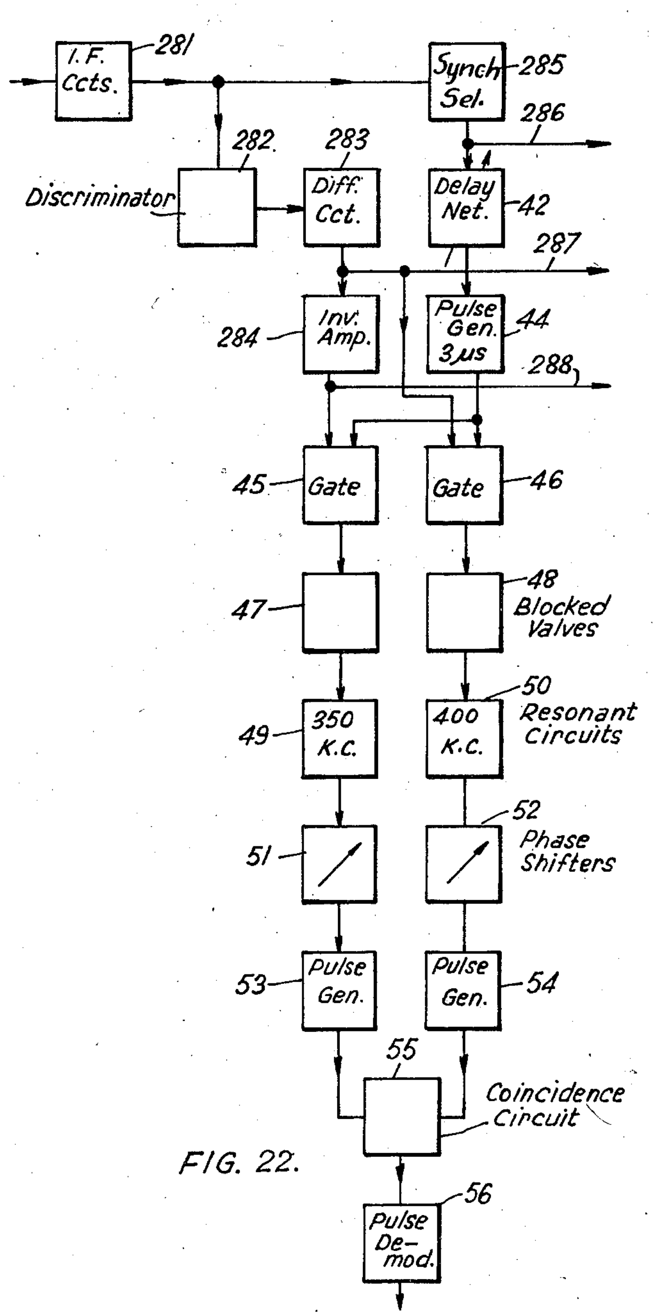

Fig. 20: Block schematic circuit of transmitter.
Fig. 21: Detailed circuit of an element of Fig. 20.
Fig. 22: Block schematic circuit of receiver.

In the first embodiment of the invention to be described with reference to Figs. 1 to 6, the principles are applied to a pulse position moduation system. For the sake of clearness, a particular case will be assumed, but it will be understood that the same principles may be applied to other cases.

It will be assumed that the system will provide 12 channels for the transmission of speech signals occupying in each channel a frequency band whose upper limit is 3 kilocycles per second. This requires a minimum sampling frequency for each channel of 6000 times per second; but in order to facilitate separation of the signal frequencies from the sampling frequency, the latter will be taken as 10,000 times per second.

Accordingly, synchronising pulses will be transmitted at intervals of 100 microseconds, and between any pair of synchronising pulses all the channel pulses must be transmitted in their proper time positions.

It follows that the interval or period alloted to each channel will be about 8 microseconds. In the present example, the principles of the invention are applied by means of a two-index system, and so two pulses must be transmitted during each channel period of 8 microseconds. Each of these pulses may be assumed to have a duration of about 0.1 microsecond (though any convenient duration may be used), and in order to allow a liberal margin for imperfect phasing of the pulses, for guard intervals, and for synchronising pulse selection, a period of about 2 microseconds will be alloted for the total range of deviation of each pulse, with a gap of about 1 microsecond between the two periods.

Fig. 1 shows a block schematic circuit diagram of the arrangements at the transmitting end of the system. This actually shows the apparatus required for one channel only, in addition to that required for transmitting the synchronising pulses, but the apparatus for all channels is identical, except as regards certain adjustments which will be explained, and will be duplicated for each channel.

Referring to Fig. 1, a master sine-wave oscillator 1 supplies waves at 10 kilocycles per second to a conductor 2 to which the equipment for each channel is connected. To the conductor 2 is also connected a synchronising pulse generator 3 of conventional type which produces a train of positive synchronising pulses of duration, for example, of 2 microseconds by a process of squaring the master sine wave, differentiating in order to produce pairs of positive and negative short pulses, limiting to remove negative pulses, and shaping to produce synchronising pulses of the required duration. These synchronising pulses are delivered to an output conductor 4 connected to a cable (not shown), or a radio transmitter (also not shown), or other suitable communication device.

The equipment for one channel comprises the remaining items shown in Fig. 1. Elements 5, 6 and 7 are adjustable phase shifting circuits of any suitable type, the adjustment of which will be explained later. Element 8 is a phase modulator to which the corresponding channel modulating signal wave is applied at terminals 9 and 10. Elements 11, 12 and 13 are pulse generators similar to 3, each of which produces a train of pulses repeated with a mean repetition period of 100 microseconds. The pulses (which will be called "channel pulses") produced by generator 11 may conveniently be of 0.1 microsecond duration, and will be time-position modulated in accordance with the signal. The pulses produced by generators 12 and 13 are used as gating pulses, and should be of duration of about 1.8 and 2 microseconds respectively, for a reason to be explained later. These pulses will, of course, be unmodulated.

The channel pulse generator 11 is connected to two similar valves 14 and 15 biassed beyond cut-off, the arrangement being such that each pulse from the generator 11 sharply unblocks the valves, thereby shock-exciting two corresponding resonant circuits 16 and 17 connected respectively to the valves 14 and 15. These resonant circuits are tuned respectively to frequencies of 550 and 500 kilocycles per second.

The resonant circuits 16 and 17 should preferably each be designed to produce a short train of waves dying out after about 15 complete periods. These circuits are respectively connected to two further pulse generators 18 and 19 similar to 3, and from each of them is produced a short train of about 15 short positive pulses, which will be called a "comb" of pulses. The pulses in the comb from generator 18 will be repeated at intervals of 1.8 microseconds, while those in the comb from generator 19 will be repeated at intervals of about 2 microseconds. The comb of pulses from generator 18 and a gating pulse from generator 12 are applied to a gating valve 20 in such manner that one of the pulses from the comb is selected. The selected pulse will appear as a negative pulse; it is therefore applied to an inverting amplifier 21, and is delivered as the first positive index pulse to the conductor 4 and thence to the communication medium. Similarly the comb of pulses from generator 19 and a gating pulse from generator 13 are applied to a gating valve 22, and the selected pulse is applied through the inverting amplifier 21 as the second positive index pulse to the conductor 4.

It will be understood that a group (not shown) of elements similar to 5 to 22 will be provided for each additional channel of the system, and will be connected in the same way between conductors 2 and 4.

The operation and adjustment of the circuit of Fig. 1 will be explained with respect to the diagrams of Fig. 2. In this figure each graph represents pulse amplitudes with reference to a horizontal time scale and in all the graphs the time scale is the same. In graph A there are shown a series of channel periods each of 8 microseconds duration, separated by vertical dotted lines, preceded by a synchronising period of 4 microseconds duration occupied by a synchronising pulse 23 produced by the generator 3 of Fig. 1. It will be assumed that the channel apparatus shown in Fig. 1 is that for channel 7, and so in the seventh channel period in graph A, Fig. 2, there are shown the two gating pulses 24, 25 generated respectively by the generators 12 and 13, Fig. 1. The phase shifters 6 and 7 should therefore be adjusted so that the pulses 24 and 25 are about 1 microsecond apart, and are approximately centred in the seventh channel period. In graph B, Fig. 2 is shown the channel pulse 26 produced by the generator 11, Fig. 1, as it appears when the modulating signal voltage applied to terminals 9 and 10 of the phase modulator 8 is zero. The dotted lines 27 and 28 represent the limits of time excursion of the pulse 26 when modulated, and will be supposed to be separated by about 20 microseconds, which is about 2½ channel periods.

Graphs C and D respectively represent the combs of pulses produced by the generators 18 and 19. The initial pulses 29 and 30 of these combs are shown as coinciding in time with the pulse 26, which initiates them by means of the elements 14 to 17, as already explained. Since the repetition frequencies of these combs are 550 and 500 kilocycles per second, respectively, the twelfth pulse 31 of the first comb will also coincide with the eleventh pulse 32 of the second comb, just 20 microseconds later. These coincidences are indicated by vertical dotted lines connecting the coinciding pulses.

Now the gating pulse 24 and the comb, graph C, are applied to the gating circuit 20, Fig. 1, and accordingly only a single one of the pulses of this comb, namely pulse 33, will be selected and transmitted through the inverting amplifier 21. Similarly, the gating pulse 25, and the comb, graph D, are applied to the gating circuit 22, and the single pulse 34 of this comb will be selected.

It will be apparent that as the phase shifter 5 (Fig. 1) is adjusted, the pulse 26 and both the combs of graphs C and D will be shifted bodily along the time axis. The adjustment should be such that the pulses 33 and 34 selected by the gating pulses 24 and 25 are each roughly at the centre of the corresponding comb. This adjustment does not need to be very accurate.

It will be clear that the duration of the gating pulse 24 should be equal to the repetition period of the comb C, namely about 1.8 microseconds, while the duration of the gating pulse 25 should similarly be 2 microseconds. The pulses 33 and 34 will be called index pulses, and have been shown also in graph A inside the corresponding gating pulses 24 and 25.

Now if the channel pulse 26 is modulated and begins to move to the left, the combs will move with it, and the index pulse 33 will approach the left hand edge of the gating pulse 24. When it reaches this edge it will disappear, but will be replaced by the next pulse 35 which just appears inside the right hand edge of the gating pulse 24. Similarly for the pulse 34 and the gating pulse 25. Thus the time position of each transmitted index pulse is ambiguous, since it indicates by itself several possible time positions of the channel pulse 26. From the positions of the two index pulses together, however, the ambiguity is resolved in the receiver as will be explained later.

It will be clear that the duration of each gating pulse should ideally be just equal to the corresponding comb repetition period. However, such a critical adjustment could not be maintained, and so it is preferable to make the duration of the gating pulse slightly greater, in which case occasionally an extra pulse might be selected. This is not really material if suitable arrangements are used at the receiver, but as will be explained, the gate circuit 20 or 22 can be designed to suppress the extra index pulse.

In Fig. 2 the two gating pulses 24 and 25 have been repeated in their original time positions in graph G, and graphs H and J show the two combs as they appear when the pulse 26 is shifted by modulation to the position 36 which is close to the "early" excursion limit 27. It will be now seen that the gating pulses 24 and 25 select for transmission two later index pulses from the combs, one of which happens in this case to be the pulse 31 shown in graph C, and the other is designated 37. These pulses appear in the gating pulses 24 and 25 in new relative positions as indicated in graph G, and from these new positions, the position of the pulse 36 can be inferred. It will be evident that if the channl pulse 26 shifts close to the "late" excursion limit 28, the combs will be likewise shifted to later positions, and the gating pulses 24 and 25 will select two other pulses from near the beginning of each comb.

The channel apparatus for all the other channels operates in like manner, the only difference being that the phase shifters 6 and 7 (Fig. 1) will be adjusted to bring the gating pulses similar to 24 and 25 into the corresponding channel period, and the phase shifter 5 will be adjusted accordingly to centre the combs with respect to the gating pulses, as explained. It follows that from the circuit of Fig. 1 will be transmitted a repeated series of pulses, each series consisting of a synchronising pulse followed by twelve pairs of index pulses, each pair corresponding to one channel.

Fig. 3 shows a circuit for receiving and demodulating the index pulses produced by Fig. 1. Only the apparatus for one channel is shown, all the remaining channels being similarly equipped. The pulses after demodulation from the carrier wave (if any) are delivered to terminal 38, which is connected over conductor 39 to a synchronising pulse selector 40, of conventional type, which selects the synchronising pulses 23 (Fig. 2) and delivers them through two adjustable delay networks 41 and 42 to two pulse generators 43 and 44 similar respectively to 12 and 13 (Fig. 1) for producing gating pulses similar respectively to 24 and 25 (Fig. 2). The pulse generators 43 and 44 are connected respectively to two gating circuits 45 and 46, to each of which is also connected the conductor 39. The first and second pulses respectively selected by the gating circuits are respectively applied to blocked valves 47 and 48 for shock-exciting two corresponding resonant circuits 49 and 50, tuned respectively to 550 and 500 kilocycles per second. The short trains of waves so produced are applied through phase shifters 51 and 52 to pulse generators 53 and 54 for producing two corresponding combs of pulses similar to those produced in the circuit of Fig. 1. The elements 47 to 50 and 53, 54 may be similar respectively to the elements 14 to 19 of Fig. 1.

The two combs of pulses are simultaneously applied to a coincidence circuit 55 from the output of which is obtained a single pulse having the same degree of time modulation as the original channel pulse 26 (Fig. 2). The coincidence circuit 55 may be a valve gating circuit similar to 20 and 22 (Fig. 1) which gives an output pulse only when it receives two simultaneous input pulses. The pulses from the coincidence circuit 55 are then applied to a demodulator 56 from the output of which the original modulating signal is obtained. The demodulator should preferably be of the type employing a frequency discriminator for a reason which will be explained later.

The elements 41 to 56 will be duplicated for each channel, and the connections of the additional apparatus will be made in the same way to conductors 39 and 57.

The delay networks 41 and 42 should be adjusted so that the gating pulses produced by the generators 43 and 44 are spaced from the received synchronising pulse by the same times as the pulses 24 and 25 (Fig. 2, graph A) are spaced from the synchronising pulse 23.

In the explanation which follows, the transmission delay which occurs in the communication medium and circuits, and which affects all pulses equally, will be neglected. When it is stated that events occur "at the same time" at both ends of the system, it will be understood that the times really differ by the constant transmission delay.

The two index pulses 33 and 34 will be received at the times indicated in graph A, Fig. 2. After selection by the gating circuits 45 and 46 these pulses will initiate two combs of pulses shown in graphs E and F. The initial pulses 58 and 59 of these combs will be delayed after the corresponding pulses 33 and 34 according to the adjustment of the phase shifters 51 and 52. The corresponding delays are indicated as $t_1$ and $t_2$. These times should be adjusted by means of the phase shifters 51 and 52 so that when the channel pulse 26 is unmodulated, a coincidence occurs between two pulses 60 and 61 each of which is approximately at the centre of the corresponding comb. The significant point is that this coincidence is determined by the difference $t_1-t_2$ and so the actual values chosen for $t_1$ and $t_2$ are not critical provided that their difference has the necessary value.

Now it is clear that if the comb, graph C were delayed by the time $t_1$, its later pulses would exactly coincide in time with the pulses of comb graph E, while if the comb graph D were delayed by the time $t_2$, its later pulses would coincide exactly with the pulses of comb F. Thus if $t_1$ and $t_2$ are constant, the coincidence 60—61 will occur at a fixed time after the coincidence 29—30, which coincides with the channel pulse 26. In other words, the coincidence 60—61 occurs at a fixed time T after the channel pulse 26, and will move with it.

The coincidence of pulses 60 and 61 thus causes the coincidence circuit 55 (Fig. 3) to produce an output pulse which is always the constant time T later than the channel pulse 26, and will therefore bear the same time modulation, which extends over a range of ±10 microseconds, in spite of the fact that the time excursion of the index pulses is only ±1 microsecond.

Graphs K and L show the positions of the combs produced by the elements 53 and 54 at the receiver when the channel pulse 26 is shifted to the position 36. The initial pulses 58 and 59 of the combs of graphs K and L are again respectively later than the pulses 31 and 37 shown in graph G by the times $t_1$ and $t_2$, and the pulses 62 and 63 from each comb which now coincide are earlier in the combs, but they still coincide later than the channel pulse 36 by the time T. Hence the pulses obtained at the output of the coincidence circuit 55 (Fig. 3) are spaced in time in exactly the same way as the original modulated channel pulses, but are later by the time T.

It should be pointed out that a second coincidence occurs between the pulses 64 and 65 of the combs K and L exactly 20 microseconds later than the first one. This will produce a corresponding second output pulse which, however, is immaterial if a suitably tuned discriminator is used for demodulating the output pulses. If desired, however, the coincidence circuit 55 can be designed to suppress the second output pulse.

So far nothing has been said about the duration of the pulses which make up the combs. Since all the combs at the transmitting and receiving ends are effectively locked together in time, the pulse duration is theoretically immaterial so long as it does not exceed a value which would cause unwanted partial coincidences between the combs. However, the effect of noise has to be taken into account. Noise will cause the combs at the receiving end to shift independently in time by small amounts, and if the pulses are too short, some of the wanted coincidences may be lost altogether. Since the difference between the repetition periods of the two combs is about 0.2 microsecond, if the pulse duration is chosen to be 0.1 microsecond, when a mutual shift of the two combs reaches a value such as just to cause the proper coinciding pulses to miss one another, there will just be a coincidence of the adjacent pair of pulses, with, of course, a corresponding error in the position of the output pulse. Thus, the duration to be chosen for the comb pulses at the receiving end is half the difference between the two comb periods, which in this case will be 0.1 microsecond. If the duration of the comb pulses exceeds the whole difference between the two comb repetition periods, then multiple coincidences will appear even in the absence of noise.

At the transmitting end the duration to be chosen for the comb pulses is not critical, but for the sake of uniformity the same value of 0.1 microsecond may be chosen for the duration of these pulses. It should be pointed out, however, that the duration of the comb pulses at the transmitting end, and of the index-pulses derived therefrom, need not be the same as the duration of the comb pulses at the receiving end, this latter duration being determined in the manner already explained.

A consideration of Fig. 2 will show that if occasionally two adjacent index pulses are admitted by one of the gating pulses 24 or 25 at the transmitting end, the effect at the receiving end will be negligible. All that will happen is that the corresponding resonant circuit 49 or 50 (Fig. 3) will be shock-excited a second time in the same phase. This will increase the amplitude of the train of waves so produced, but the resulting pulse comb (graph C or D, Fig. 3) will be unaffected.

It has been stated that the number of pulses in each of the combs should be about 15. The actual number is not critical, but the number should be such that the total duration of the comb exceeds by a reasonable margin the sum of the total time excursion of the channel pulse 26 and the time occupied by the two gating pulses 24 and 25. Thus in the present example, the duration of the pulse comb should exceed 20+5=25 microseconds. Fifteen pulses of the comb, graph D, occupy 28 microseconds, which gives a safe margin.

It is desirable to explain at this point that although the initial pulses 29 and 30 of the combs, graphs C and D, Fig. 2, have been shown for simplicity as coinciding in time with the channel pulse 26, in practice there will not generally be an exact coincidence, because the first pulse produced by each of the resonant circuits 16 and 17 (Fig. 1) will be delayed slightly after the channel pulse 26, and the initial pulses 29 and 30 will not exactly coincide with one another because the periods of the two resonant circuits are different. This is however immaterial because of the phase adjustment of the corresponding combs at the receiver, already explained. The times $t_1$ and $t_2$, graphs E and F can always be adjusted to produce the desired coincidence of pulses 60, 61, one from the centre of each comb.

It will now be explained that the technique employed at the receiving end for resolving the ambiguity is an important factor in the improvement of the signal-to-noise ratio, and forms the subject of copending application Serial No. 257,808, filed November 23, 1951 (C. W. Earp). In the example illustrated in Figs. 1 to 3, if the trains of waves produced by the shock excited resonant circuits 49 and 50 (Fig. 3) were heterodyned together to yield a 50 kilocycle wave from which the output pulse is derived, this wave and pulse would bear the time modulation of the original channel pulse 26, but the small relative phase shifts of the two heterodyned waves caused by the noise would be multiplied ten times, and no advantage would be gained. However by the use of the coincidence technique there is no such multiplication effect. If it be assumed for example that the noise is sufficient to shift either of the received digit pulses by amounts not exceeding $\frac{1}{20}$ microsecond, then it can easily be seen that the leading edge and the trailing edge of the output pulse passed by the coincidence circuit 55 (Fig. 3) can each be late or early by not more than $\frac{1}{20}$ microsecond, while the duration of the output pulse can never exceed $\frac{1}{10}$ microsecond, though it may often be less than this. It thus appears that the noise power which accompanies the reproduced channel pulse cannot exceed the noise power which accompanies one of the index pulses. If therefore, the time excursion of the original modulated channel pulse is ten times the time excursion of the index pulses, it will be seen that an improvement of signal-to-noise ratio of 20 decibels is obtained.

If in the demodulation process both the leading and trailing edges of the reproduced pulses are utilised, then a further gain of 3 decibels in signal-to-noise ratio can be obtained, because the noise which affects each edge is derived from a different index pulse, and so the deviation of the mean position of the pulse is on the average less than the deviation of either edge, because the two noise effects are unrelated. Advantage may be taken of this if the time position modulated pulses at the output of the coincidence circuit 55 (Fig. 3) are demodulated in a suitable way. Fig. 4 shows a block schematic circuit of the preferred form of the demodulator 56 of Fig. 3. It consists of a band pass filter 66 for selecting a harmonic of the repetition frequency (10 kilocycles per second) of the output pulses followed by a frequency discriminator 67 of any conventional type at the output of which will be obtained the differential of the signal wave (since the original channel pulse 26, Fig. 2, was effectively phase modulated). To obtain the signal wave itself the discriminator 67 is followed by an integrating circuit 68, according to well known practice. This method of demodulating position modulated pulses is described in British patent specification No. 581,005 (C. T. Scully).

In this case the reproduced noise depends on the variation of the mean time position of the pulses and not alone on the variation of the leading or trailing edges. The harmonic selected by the filter 66 should preferably be the fifth harmonic (50 kilocycles per second) since in this case the extra pulses due to repeated coincidences of the combs at the receiver already referred to will have no undesirable effect.

The discriminator 67 may for example be of the Foster-Seeley type illustrated in Fig. 52*a* on page 586 of the Radio Engineers' Handbook by F. E. Terman, 1st edition, 1943. Since such a discriminator generally includes tuned circuits, which can be used for selecting the desired harmonic, the filter 66 may not be required.

If the duration of the comb pulses is assumed to be 0.1 microsecond, it will be seen that if the noise is such that the digit pulses can be shifted by more than 0.05 microsecond, then the coincidence shifts to the adjacent pair of pulses, and a timing error of 2 microseconds will occur for the reproduced pulse. If the noise is such that the error occurs relatively frequently, then no appreciable advantage can be obtained by the arrangement described. For this reason it was stated above that the noise conditions should be moderately good in order that the improvement of signal-to-noise ratio could be obtained according to the invention. Thus, for example, if with a conventional pulse position modulation system using a time deviation of ±1 microsecond a signal-to-noise ratio of 40 decibels (which is only moderately good) is obtained, the present invention enables this to be increased to at least 63 decibels. However, since two digit channels are used, for a fair comparison, 6 decibels should be subtracted, making a real improvement to at least 57 decibels.

It may be said that the important point is that the demodulation process includes an operation which is non-linear or discontinuous; thus the two combs at the receiving end may be progressively shifted in time relatively to one another for a certain time without materially affecting the result, up to a point at which a sudden relatively large change in the result occurs.

In a multichannel two-index system according to the invention, the interchannel cross-talk will be principally from the channel preceding the channel concerned, and most of it will affect the first of the two index pulses. The effect of this cross-talk may be practically eliminated by increasing the duration of the comb pulses corresponding to the first index at the receiving end, and decreasing the duration of the comb pulses corresponding to the second index, while maintaining the sum of the two pulse durations equal to the difference between the two comb repetition periods. In these circumstances the pulse produced at the output of the coincidence circuit 55 (Fig. 3) will not be affected by the cross-talk deviations of the first comb, but will bear as before the noise deviations derived from the second comb.

If desired, three or more index pulses may be used to characterise the time position of the pulse 26, Fig. 2. The signal-to-noise ratio can then be further increased provided that the signal-to-noise ratio of each individual index channel is already fairly good.

This can be done by providing in Fig. 1 additional elements (not shown) corresponding to 6, 12, 14, 16, 18 and 20, for each additional index. There will of course be additional gating pulses (not shown) similar to 24 and 25, Fig. 2, graph A, and the duration and separation of these gating pulses must be adjusted so that they fit into the channel period with reasonable margins. In the receiver (Fig. 3) the elements 41, 43, 45, 47, 49, 51 and 53 will be duplicated for each index, and the coincidence circuit 55 will be designed to operate only on the simultaneous receipt of one pulse from each comb.

The best results are obtained when the repetition periods of the pulses of the corresponding combs are close together: for example, if in a four-index system, periods of 1.0, 1.1, 1.2 and 1.3 microseconds are employed, the possible improvement in signal-to-noise ratio may be more than 60 decibels. This would however only be needed if an exceedingly high signal-to-noise ratio (such as 100 decibels) is required, and could only be obtained if as already stated, the signal-to-noise ratio of each index channel is sufficiently good. The chief reason for using four or more indices would be when there is a requirement that the individual index channels be operated at very low signal deviation. The ability of the system to yield unambiguous results in the presence of high noise level will be best promoted if the comb periods selected extend approximately over a 2:1 range, and are in geometrical progression. It can be shown that this choice has the property that the best immunity from false coincidences of the comb pulses due to noise is produced when the depth of modulation of the original channel pulse 26 is moderate, but is not guaranteed in the case of a large depth of modulation. This means that if the noise affecting the index channels should increase so that false coincidences occur, the resulting high output noise can be overcome by reducing the depth of modulation until the false coincidences cease. This facility enables the best possible results to be obtained under varying noise conditions.

It is desirable to point out that the maximum range of time displacement of the channel pulse 26 (Fig. 2, graph B) is equal to the coincidence period of the two pulse combs, which with the particular numerical values chosen above is 20 microseconds. If this range is exceeded, an ambiguity of one or more coincidence periods is introduced. Furthermore, the expansion, that is, the ratio of the time displacement of the channel pulse to that of the index pulses, is given by the number of comb pulse periods in the coincidence period. This in the case assumed above, the expansion is 10. If the frequencies chosen for the two resonant circuits are respectively $F_1$ and $F_2$, the expansion is $F_1/(F_2-F_1)$, and the maximum range of time displacement of the channel pulse is $1/(F_2-F_1)$. Thus the frequencies $F_1$ and $F_2$ should be chosen to suit the conditions to be met by the system.

Fig. 5 shows details of the preferred form of the phase modulator 8 shown in Fig. 1. It is of a known type comprising two pentode valves 69 and 70 having in common an anode load comprising a parallel resonant circuit 71 tuned to the frequency of the master oscillator 1 (10 kilocycles per second). This oscillator should be connected to the input terminals 72, 73 of the modulator, which terminals are connected to an input transformer 74 tuned to 10 kilocycles per second by the capacitor 75. The second winding of this transformer is connected between ground and the control grids of the valves 69 and 70, phase shifting networks comprising respectively the resistor 76 and capacitor 77, and the capacitor 78 and resistor 79 being interposed, whereby the phase of the waves applied to these grids is shifted by pulse or minus 45° respectively.

The terminals 9 and 10 for the modulating signal wave are connected to a transformer 80 having a secondary winding which is connected between the suppressor grids of the two valves, and which has a centre tap connected to ground. The output phase modulated waves are obtained from the terminal 81 connected to the anodes of the valves through a blocking capacitor 82.

The circuit operates in the following way. Equal and opposite signal voltages are applied to the suppressor grids of the valves, and this increases the anode current of one valve and decreases that of the other. The output alternating current is the resultant of two currents in quadrature, one of which is decreased by the signal voltage and the other increased. The phase of the output current therefore varies in accordance with the signal voltage.

Fig. 6 shows details of the elements 14, 16, 18 and 20 of Fig. 1 combined in a single circuit. Elements 15, 17, 19 and 22 would be similar. In Fig. 6 the pulses from the generator 11 (Fig. 1) are applied to an input terminal 83 which is connected through a capacitor 84 to the control grid of a valve 85 which is normally blocked by cathode bias produced by the network 86. Connected in series with the anode circuit of valve 85 is a parallel resonant circuit comprising an inductor 87 and a capacitor 88. This resonant circuit is coupled through a capacitor 89 to a second similar parallel resonant circuit comprising an inductor 90 and a capacitor 91.

The two parallel resonant circuits should both be tuned to the same frequency, which will be near to 550 kilocycles per second, and should be such that the combination forms a narrow band-pass filter, with the band centred on 550 kilocycles per second.

The elements 87 to 91 may be so designed that when shock-excited by the sudden unblocking of the valve 85 by a positive pulse from the generator 11 (Fig. 1), a train of output waves is produced, the amplitude of which expands uniformly from zero, and then contracts again. This condition may be obtained by choosing the value of the capacitor 89 so that critical coupling is produced between the two resonant circuits, whereby they constitute substantially a band-pass filter with a "flat topped" frequency characteristic. By suitable choice of the resonance frequency and the damping factors of the resonant circuits, each shock-excitation may be made to produce a short train of waves with about 15 positive and 15 negative loops of appreciable amplitude.

The elements 87 to 91 make up the resonant circuit 16 of Fig. 1, and the circuits 17 will be the same, except that the two parallel resonant circuits should be tuned near to 500 kilocycles per second in order to produce a narrow band-pass filter, with the band centered on 500 kilocycles per second.

It may be added that the resonant circuits may be constituted by various forms of filter circuits or other resonant networks. Thus the term "resonant circuit" should therefore be understood to include any appropriate network of this sort.

The train of output waves from the resonant circuit is applied through a blocking capacitor 92 to the control grid of a limiting valve 93 so biased and arranged that there are produced at the anode a series of about 15 positive and 15 negative rectangular waves or pulses, according to the well known "squaring" technique. These waves are differentiated by the capacitor 94 and resistor 95 to produce about 15 pairs of short positive and negative differential pulses which are applied to the control grid of the gating valve 96 normally biassed beyond the cut-off by the cathode bias network 97. The negative differential pulses have no effect on the gating valve, and the 15 positive differential pulses constitute the comb illustrated in graph C, Fig. 2. Gating pulses from the generator 12 (Fig. 1) are also applied to terminal 98 and through the blocking capacitor 99 to the suppressor grid of the gating valve, thus permitting one of the positive comb pulses to pass from the anode to the output terminal 100 through the blocking capacitor 101. This output pulse is then the corresponding index pulse.

In order to prevent the gating valve from responding to a second comb pulse (which might otherwise be selected in circumstances explained above), the anode of the valve 96 is connected through a capacitor 102 and a rectifier 103 to the capacitor 104 connected in series between the resistor 95 and ground. The leading edge of an output index pulse (which will be negative-going because of the inversion through the gating valve) charges the capacitor 104 negatively, thereby increasing the grid bias so that the valve 96 will not respond to the following comb pulse. A second rectifier 105 connects the capacitor 102 to ground, and provides a low resistance path for the positive going trailing edge of the index pulse. The resistor 106 shunting the condenser 104 should be chosen so that the corresponding time constant is large compared with the repetition period of the comb (2 microseconds) but small compared with the repetition period of the channel pulses (100 microseconds), so that the condenser 104 will be substantially discharged by the time the next channel pulse arrives at terminal 83.

The elements 102 to 106 are, however, not essential, and could be omitted.

The coincidence circuit 55 (Fig. 3) can be arranged in just the same way as the valve 96, and if the additional output pulse corresponding to the extra coincidence referred to above is to be eliminated, elements similar to 102 to 106 may be provided. The time constant of the elements 104, 106 should however be chosen to be large compared with the coincidence period (20 microseconds). When three or more indices are employed, the coincidence circuit 55 could consist of a train of two or more valves arranged similarly to 96 for producing the multiple coincidences, and only the last of them need be provided with the suppressing elements 102 to 106.

It may be added that, if desired, an additional resistor (not shown) may be connected between the cathode of each of the valves 85, 93 and 96 and the positive high tension terminal in order more definitely to fix the cathode potential.

In the second embodiment of the invention which will now be described, the same basic system will be assumed, and it will be a two-index system, but only one of the indices is ambiguous in this case. The unambiguous index is represented by a normal position-modulated pulse which is transmitted with a small time excursion approximately the same as that of the ambiguous index pulse.

The transmitting circuit of this system is shown in Fig. 7. Certain of the elements are the same as certain of those shown in Fig. 1, and have been given the same designation numbers. The phase modulator 107 is similar to 8, Fig. 1, except that the phase excursion is limited to ±3.6° whereby the pulses produced by the pulse generator 108 (which is similar to 3) have a time excursion within the limits ±1 microsecond. These pulses are transmitted direct to the conductor 4 as the first index pulses and carry the signal with small deviation, buit without ambiguity.

In order to obtain the ambiguous index pulse, the phase modulated waves at the output of the modulator 107 are applied to a frequency multiplier 109 which multiplies the frequency by ten. The output waves from this multiplier will accordingly bear a phase modulation which is multiplied by ten, and will therefore be within the limit ±36°.

A second frequency multiplier 110 is connected to conductor 2 and multiplies the frequency from the master oscillator 1 by 9, producing an unmodulated output wave of frequency 90 kilocycles per second. These waves are applied through the phase shifter 6 to an amplitude modulator 111 operated as a frequency changer, together with the phase modulated waves of frequency 100 kilocycles per second from the multiplier 109. The lower sideband having a frequency of 10 kilocycles per second is selected by a filter included in the modulator. Similar frequency changing circuits are employed in some of the later embodiments, and the modulators will be called "frequency changing modulators."

The selected sideband is applied to the pulse generator 11 which produces a channel pulse from which, as before, a pulse comb is produced by the elements 15, 17 and 19. It should be noted that the sideband at 10 kilocycles per second will bear the same degree of phase modulation as the 100 kilocycle wave at the output of the frequency changer 109, that is, within the limits ±36°, or ten times the degree of modulation of the 10 kilocycle wave at the output of the phase modulator 107. Thus the channel pulses at the output of the pulse generator 11 will bear a time modulation within the limits ±10 microseconds. Assuming that the resonant circuit 17 is tuned to 500 kilocycles per second, as in the case of Fig. 1, the pulse comb produced at the output of the pulse generator 19 will be exactly similar to the comb shown in graph D, Fig. 2.

The receiver circuit, Fig. 8, has also several elements similar to elements in Fig. 3 and bearing the same designation numbers. The first and second index pulses of the channel are respectively selected as before by the gating circuits 45 and 46 by means of corresponding gating pulses of 2 microseconds duration derived from the synchronising pulse selector 40. The second index pulse produces a pulse comb, as before, by means of the blocked valve 48, resonant circuit 50 tuned to 500 kilocycles per second, and pulse generator 54. The first unambiguous index pulse produces a train of waves at the output of the resonant circuit 49 which in this case is tuned also to 500 instead of 550 kilocycles per second. These are supplied to a frequency changing modulator 112 which is also supplied with a continuous unmodulated wave of frequency 450 kilocycles per second through a phase shifter 113. This wave is obtained by applying the synchronising pulses from the selector 40 to a third blocked valve 114 which shock-excites a third resonant circuit 115 tuned to 450 kilocycles per second, and having very small damping, so that a substantially continuous 450 kilocycle output wave is obtained. The lower sideband output at 50 kilocycles per second is selected from the modulator 112 by a band filter included therein, and is supplied to the pulse generator 53.

Since the first index pulse is time modulated within the limits ±1 microsecond, the 500 kilocycle wave at the output of the resonant circuit 49 will be phase modulated within the limits ±180°. It follows that the 50 kilocycle sideband at the output of the modulator 112 will also be phase modulated within the limits ±180°. Thus the total time excursion of the comb of pulses produced by the pulse generator 53 will be ±10 microseconds, and these pulses will be repeated at intervals of 20 microseconds. This comb is much coarser than the other, and its pulses are used more like gating pulses to enable the coincidence circuit 55 to pick out the particular pulse of the comb produced by the pulse generator 54 which corresponds to the time deviation of the original channel pulse.

Since the first index pulse has only a small time excursion, it will be subject to noise, the effect of which is multiplied by ten because of the frequency change produced by the modulator 112. Accordingly, the pulses produced by the generator 53 must be considerably lengthened in order that this noise shall not be transferred to the pulses produced at the output of the coincidence circuit 55. A duration of about 1 microsecond would be suitable for these pulses, assuming that the pulses of the other comb are of 0.1 microsecond duration as before. The gain of 3 decibels in signal-to-noise ratio obtained from the combination of the noise affecting the two combs in the first embodiment of the invention is accordingly not available in the present case.

The operation of the circuit will be explained with reference to Fig. 9, which is similar to Fig. 2. Graph A shows the channel periods arranged as before. In the seventh channel period are shown the unambiguous first index pulse 116 produced by the generator 108 (Fig. 7), and the gating pulse 117 of 2 microseconds duration produced by the generator 13. Graph B shows the channel pulse 118 produced by the pulse generator 11, and having limits of time excursion of ±10 miscroseconds represented by the dotted lines 119 and 120. Graph C shows the pulse comb produced by the generator 19 in response to the channel pulse 118 when in the unmodulated position shown. The phase shifter 6 should be adjusted so that the gating pulse 117 picks out a pulse 121 at the centre of the comb of about 15 pulses. The pulse so picked out is transmitted as the ambiguous second index pulse. Graph D shows again the unambiguous first index pulse 116 which is transmitted. In this case no second comb of pulses is produced at the transmitter.

The second index pulse 121 produces at the receiver (Fig. 8) the comb shown in graph E, which occurs at the output of the generator 54. The first index pulse 116 produces at the output of the generator 53 a comb of pulses spaced 20 microseconds apart, two of which are shown at 122 and 123 in graph F. These pulses should be much wider than the pulses of the other comb, as already stated. By adjusting the phase shifter 113 (Fig. 8) the pulses 122 and 123 may be shifted either way along the time axis, and the adjustment should be such that the pulse 122 coincides with the centre pulse 124 of the comb, graph E, when the channel pulse 118 is unmodulated. The pulse 124 appears as the reproduced channel pulse at the output of the coincidence circuit 55 (Fig. 8).

Suppose now that the channel pulse 118 shifts to the position 125 which is, for example, 9.2 microseconds early. The first index pulse 116 will shift by exactly one tenth of this value, namely 0.92 microsecond, earlier, to the position shown in graph G at 126. At the same time the comb, graph C, shifts 9.2 microseconds earlier to the position shown in graph H, and the gating pulse 117 shown also in graph G, will pick out a later pulse 127 for transmission as the second index pulse. At the receiver, the first index pulse 126, shown again in graph J, will occur 0.92 microsecond earlier than before. The receipt of the index pulse 127 will initiate the comb shown in graph K, while the pulse 126 will produce the two pulses 128 and 129 shown in graph L. Since the shift of the pulse 126 is effectively multiplied by ten on account of the frequency change in the modulator 112, it is evident that the pulses 128 and 129 will be 9.2 microseconds earlier than before. The pulse 128 will pick out a pulse 130 from the comb, graph K, and it will be evident that this pulse must be spaced from the pulse 125 in graph B by the same time as the pulse 124 graph E is spaced from the pulse 118. In other words the time excursions of the channel pulse 118 are reproduced exactly by the pulses at the output of the coincidence circuit 55. The noise which accompanies the output pulses is only that which accompanies the second index pulse, which is not multiplied up by a frequency changing process.

It will be noted from graphs K and L that the pulse 129 will sometimes pick out a second pulse 131 from the comb generated at the receiver. As already explained above, this will be immaterial if the discriminator is tuned to 50 kilocycles per second; or the additional pulse can be eliminated in the coincidence circuit 55 (Fig. 8).

Attention is directed to the use of the frequency change applied to the output of the resonant circuit 49 in Fig. 8. This is necessary to make equal the envelope time shifts of the phase modulated waves from which the two combs are respectively derived. By envelope time shift, we mean the maximum time excursion of some characteristic point, such as a zero point, of the wave. When this is done, the time shifts of the two resulting combs will always be equal, and these time shifts must always be equalised before the coincidence principle can be applied. In the system described with reference to Figs. 1 to 6, the index pulses were derived in the transmitter from two combs with equal time shifts, and so the time shifts of the combs derived from these index pulses at the receiver (Fig. 3) were already equal. In the present case, the ambiguous second index pulse was derived from a comb having ten times the time shift of the unambiguous pulse, and so a time shift multiplication of 10 had to be introduced in the receiver (Fig. 8) in order that the two resulting combs should have the same envelope time shift. A similar case occurs in the fourth embodiment to be described later, and is illustrated in Fig. 18.

It should perhaps be explained that the multiplication is obtained in the frequency changing modulator because the output sideband bears the same angular phase shift as the input phase modulated wave, when the heterodyne wave is unmodulated, and the time shift corresponding to a given angular phase shift is inversely proportional to the frequency. Therefore as the lower sideband, having one tenth the frequency of the input wave, is selected from the modulator, the envelope time shift of the sideband will be multiplied by ten.

As in the case of the first embodiment, additional ambiguous indices may be employed if desired, and may be useful when the signal-to-noise ratio of the digit channels is such that false coincidences may be produced. An arrangement analogous to a binary code as used in a pulse code modulation system may for example be set up, in which the time excursions of the various index pulses are respectively ±1 ±2, ±4, ±8 microseconds, and so on, the first index being unambiguous. As already explained, however, the signal will be accurately reproduced without the quantising errors of the pulse code modulation system.

In the third embodiment of the invention illustrated in Figs. 10 to 14, the indices are transmitted by trains of phase modulated waves instead of by short pulses. In the arrangement shown in Figs. 10, 11 and 12 multiplexing of signal channels is carried out by frequency division, while in the modified arrangement illustrated in Figs. 13 and 14 multiplexing is by time division.

Fig. 10 shows one form of the transmitting circuit of this embodiment, and includes certain elements similar to corresponding elements in Fig. 1. These elements have been given the same designation numbers and operate in the same way, except that different frequencies are used, as will be pointed out. Fig. 10 illustrates two slightly different arrangements either of which may be obtained by appropriately operating the three switches 132, 133 and 134. It will be first assumed that the switches are in the position shown in the figure.

It will also be assumed, for example, that the phase modulator 8 is designed to produce a maximum phase excursion within the limits +1 radian. The pulses produced by the generator 11 will in this case have a maximum time excursion within the limits +16 microseconds approximately. The two resonant circuits 16 and 17 should in this case be tuned to frequencies of 200 and 180 kilocycles per second, respectively. The pulse generators 18 and 19 will then produce combs with pulse repetition periods of 5 and 5.5 microseconds, respectively. These combs should preferably each consist of about 9 pulses, in this case.

In the present case the two gating circuits 20 and 22 are opened simultaneously by gating pulses from the pulse generator 12, and the duration of these gating pulses should be about 6 microseconds. The phase shifters 5 and 6 should be adjusted so that under conditions of zero modulation an index pulse is picked out from approximately the centre of each pulse comb. In practice one of these phase shifters could probably be omitted. Since the gating pulses are slightly longer in duration than either comb period, sometimes two index pulses will be selected.

It will be noted that the circuit up to this point is substantially the same as the circuit of Fig. 1 except for the fact that the gating pulses corresponding to the two indices are simultaneous instead of in succession. Now, in the present embodiment, instead of transmitting the index pulses directly, they are used to produce two corresponding trains or packets of waves which bear the same time shifts as the index pulses. These packets of waves are transmitted to the receiver, and serve as the ambiguous indices which characterise the signal amplitude.

To produce these packets of waves, the index pulses selected by the gating circuits 20 and 22 are passed to a second pair of corresponding blocked valves 135, 136 followed by resonant circuits 137 and 138 tuned to 200 and 180 kilocycles per second, respectively. The elements 135 to 138 may be generally similar to the elements 14 to 17, but each of the two resonant circuits should preferably be in the form shown in Fig. 6 and should be designed so that the wave packets produced increase in amplitude smoothly from zero to maximum in about 50 microseconds, and then decrease again in the same period, so that the wave packets each occupy a period of about 100 microseconds. Since the period of each wave packet is the same as that of the corresponding pulse comb, the time shift of the index pulse could be determined from an observation of the phase of some part of the wave packet, with respect to a standard phase. Thus the index pulses can be regarded as transmitted by phase modulation of the wave packets.

It will be clear that since the pulse repetition period of each comb is the same as the period of the corresponding resonant circuit, it does not matter if two index pulses are sometimes selected by the gating pulse.

The wave packets at the output of the resonant circuits 137 and 138 may be combined and transmitted over a co-axial cable (not shown), for example, or they may be directly radiated from an antenna (also not shown). Alternatively they could be used to modulate a radiated V. H. F., U. H. F., or S. H. F. carrier wave.

It will be evident that additional channels could be produced on a frequency division basis by selecting other pairs of frequencies such as 140 and 160, or 220 and 240 kilocycles per second instead of the frequencies 200 and 180 suggested above. The same high frequency carrier wave could be simultaneously modulated by the phase modulated wave packets having all these pairs of frequencies.

The receiving circuit for the system of Fig. 10 is shown in Fig. 11 which, like Fig. 10, shows two slightly different arrangements, which can be selected by two switches 139 and 140. These switches should be first assumed to be in the position shown.

The phase modulated wave packets having frequencies of 200 and 180 kilocycles per second, after demodulation from the carrier wave (if any) are supplied to conductor 141 and thence to two band pass filters 142 and 143 which separate the two kinds of wave packets. The 200 kilocycle wave packets are supplied from the filter 142 through a phase shifter 144 to a pulse generator 145 similar to 18 which produces from each wave packet, in the manner already explained a comb of pulses having a pulse repetition period of 5 microseconds.

The 180 kilocycle wave packets are supplied from filter 143 direct to a second pulse generator 146 similar to 19 which produces a comb having a pulse repetition period of 5.5 microseconds. The two combs are applied to a coincidence circuit 147 to yield output pulses bearing the output time modulation of ±16 microseconds, which pulses are passed through a demodulator 148 to recover the signal wave, as before. The elements 145 to 148 correspond exactly to the elements 53 to 56 of Fig. 3. The phase shifter 144 should be adjusted to obtain a coincidence between pulses, one from the centre of each comb, under the condition of zero modulation. This phase shifter might have been connected instead in front of the pulse generator 146.

In this case the discriminator should preferably be tuned to 20 kilocycles per second in order that an additional coincidence of the two combs at the receiver should be immaterial.

It will be noted that the use of the phase modulated wave packets makes the receiver much simpler than that of Fig. 3.

By choice of the frequencies 200 and 180 kilocycles per second, the expansion will be about 10 as before, but the time excursion of the channel pulse could be as much as ±25 microseconds. In accordance with the explanation given above, by using higher frequencies such as 580 and 600 kilocycles per second, the same time excursion can be used, but the expansion is now 30, and an improvement of signal-to-noise ratio of about 30 decibels could be produced.

Frequencies such as 200 and 180 kilocycles per second may be inconveniently low for direct radiation, and in order to use higher frequencies while at the same time maintaining the expansion not more than 10, the alternative arrangements shown in Figs. 10 and 11 may be used. The switches 132, 133, 134, 139 and 140 will now all be supposed to be operated to the alternative positions.

In the transmitter circuit Fig. 10, the frequency changing modulator 149 followed by a band pass filter 150 are inserted between the resonant circuit 16 and the pulse generator 18. At the same time the waves from the master oscillator 1 are supplied to a frequency multiplier 151 which multiplies by 8, the output of which is supplied to the modulator 149, and will have a frequency of 80 kilocycles per second.

The resonant circuits 16 and 17 should now be tuned to 900 and 1000 kilocycles per second, respectively, and the filter 150 should be designed to select the upper sideband (980 kilocycles per second) from the modulator 149. The resonant circuits 137 and 138 should be tuned to 980 and 1000 kilocycles per second, and these are now the frequencies which are actually radiated.

In the receiver, Fig. 11, the operation of the switches 139 and 140 to the other position inserts the frequency changing modulator 152 and the band pass filter 153 between the filter 142 and the phase shifter 144. At the same time a detector 154 is connected to the filter 142 and recifies the received waves, which bear an envelope component at 10 kilocycles per second which is of appreciable magnitude. This component is selected by the band pass filter 155 and passed to a frequency multiplier 156 which multiplies by 8. The output of this multiplier, which has a frequency of 80 kilocycles per second, is supplied to the modulator 152.

The filter 142 will in this case be designed to select the 980 kilocycle wave packets which are received over conductor 141, and these are supplied directly to the modulator 152. The lower sideband at 900 kilocycles per second is selected by the filter 153 and is supplied through the phase shifter 144 to the pulse generator 145. The filter 143 will in this case be tuned to select the wave packets at 1000 kilocycles which are passed direct to the pulse generator 146. With this arrangement, the phase shifter 144 could alternatively have been connected between the elements 143 and 146, or between 155 and 156, or between 156 and 152.

By use of the frequencies 900 and 1000 kilocycles, the expansion is 10 as before, but the coincidence period is now 10 microseconds, so that the maximum time excursion for the channel pulse would be only ±5 microseconds. These frequencies could have been directly radiated, but this would not be a convenient arrangement for a single channel. Therefore the frequency change is introduced to enable the radiated frequencies to be put closer together (980 and 1000 kilocycles) while still maintaining the expansion at not more than 10. The complementary frequency change has to be introduced at the receiver to equalise the envelope time shifts, as already explained.

In this case the discriminator forming part of the demodulator 148 should preferably be tuned to 100 kilocycles per second.

It has already been mentioned that the wave packets at 200 and 180 kilocycles could be used to modulate a high frequency carrier wave, but the bandwidth occupied by a single channel would in that case be rather excessive. Instead it is better to translate each of them to a much higher frequency before radiation. Suppose therefore the wave packets are translated to frequencies of 80,020 and 80,000 kilocycles per second respectively. Then the receiver of Fig. 11 may be replaced by the modified arrangement shown in Fig. 12.

The wave packets at 80 megacycles per second are received by a conventional receiver of which only the intermediate frequency circuits, which will be assumed to be at 2 megacycles per second, are shown at 157. Two bandpass filters 158 and 159 select the wave packets which have been transferred to 2000 and 2020 kilocycles per second, respectively. The selected wave packets are respectively supplied to two frequency changing modulators 160 and 161. These are also supplied with waves at 900 and 1000 kilocycles per second from an oscillator 162 generating 100 kilocycles per second, and two frequency multipliers 163 and 164 multiplying respectively by 9 and 10.

The lower sidebands at 1100 and 1020 kilocycles per second in each case are selected by respective bandpass filters 165 and 166. These sidebands are supplied respectively to two further frequency changing modulators 167 and 168 to which the outputs from filters 158 and 159 are also respectively supplied. The lower sidebands are selected by respective bandpass filters 169 and 170. These sidebands will be at frequencies of 900 and 1000 kilocycles per second, respectively and will bear the differential phase modulation of successive received wave packets. These sidebands are then supplied to elements 144 to 148 (not shown in Fig. 12) as described with reference to Fig. 11.

In order to attain this result, it is necessary to design the filters 165 and 166 so that they introduce a delay of 100 microseconds. Alternatively suitable delay networks (not shown) may be added to the filters. In this way each wave packet is effectively combined with the preceding one in the modulator 167 or 168, and the output sideband will evidently be phased in accordance with the difference between the phases of successive wave packets. Thus the arrangement measures effectively the rate of change of the phase of the wave packets. If followed by a phase demodulator the circuit would yield the differential of the signal wave. If therefore, a frequency discriminator is used the second differential of the signal wave will be produced, so the discriminator 67 of Fig. 4 should in this case be followed by two integrating stages.

Figs. 13 and 14 show the manner in which the third embodiment can be adapted for multiplexing on a time division basis.

A few of the elements shown in Fig. 13 are the same as in Fig. 1 and have been given the same designation numbers. The phase modulator 8 to which the channel signal is applied is connected to a frequency multiplier 171 which multiplies by 5 and which in turn is connected to two further frequency multipliers 172 and 173 which multiply respectively by 9 and 10. The waves at the output of the multiplier 172, which have a frequency of 450 kilocycles per second, are applied to a frequency changing modulator 174 which is also supplied with waves at 50 kilocycles per second obtained from the master oscillator 1 by means of a frequency multiplier 175. The upper sideband at 500 kilocycles per second is selected from the modulator 175 by the filter 176. Thus at the outputs of the elements 173 and 176 we have phase modulated continuous waves of the same frequency, namely, 500 kilocycles per second, but the phase modulations are in the ratio 9:10. These two waves are supplied respectively to two further frequency changing modulators 177 and 178 supplied from a high frequency oscillator 179 generating a frequency such as 80 megacycles per second, suitable for final radiation. Sidebands of frequencies 80.5 megacycles are selected by the filters 180 and 181 and are supplied to the gating circuits 20 and 22 and thence direct to the output conductor 4, which will be connected to the radio transmitter (not shown). The inverting amplifier 21 shown in Fig. 1 is not required. In this case, assuming a 12 channel system, the gating pulses produced by the pulse generators 12 and 13 may each have a duration of 4 microseconds, and they may be adjusted side-by-side by means of the phase shifters 6 and 7 so as just to fill the corresponding channel period of 8 microseconds.

For each channel of the system the elements referred to may all be duplicated except the master oscillator 1; if desired, also elements 175 and 179 could be common to some or all of the channels. For each channel, of course, the phase shifters 6 and 7 will be adjusted to locate the two gating pulses in the corresponding channel period.

It will be seen, therefore, that substantially a continuous wave will be radiated for 96 microseconds of each sampling period, with a 4 microseconds gap at the beginning of each such period.

This gap may be used for synchronising the receiver by simply supplying the wave to a detector which will produce a 4 microsecond pulse in response to each gap. Alternatively, if desired, a synchronising generator 182 may be connected between the conductors 2 and 4, and may be designed to deliver a pulse or packet of unmodulated waves of a suitable distinguishable frequency under the control of the waves from the master oscillator 1. Any known device may be used to produce this effect.

It will be evident to those skilled in the art, that the frequency changing stages comprising the elements 177 to 181 (inclusive) could be omitted, and the elements 176 and 173 could be connected directly to the gating circuits 20 and 22, respectively, if it is convenient to transmit a frequency of the order of 500 kilocycles per second directly, for example over a coaxial cable (not shown).

It should be pointed out that if it is desired to employ more than two indices, the elements 172, 174, and 176 may be duplicated for each extra index. For example, the frequency multiplier (not shown) corresponding to 172 could be designed to multiply by 11, producing an output phase modulated wave of frequency 550 kilocycles per second. The frequency multiplier 175 could also supply the additional modulator (not shown) corresponding to 174, and the additional filter (also not shown) corresponding to 176 would then be designed to select the lower sideband at 500 kilocycles. In order selections of frequency the multiplier 175 would also have to be duplicated. Clearly, also, an extra gating circuit (not shown) would be needed for the additional index.

It should be pointed out that with this arrangement, all the index wave packets have the same frequency, but different envelope time shifts. In accordance with the principles already explained, these envelope time shifts must be equalised in the receiver by appropriate frequency changes.

At the receiving end, the arrangements are shown in Fig. 14, which includes the apparatus for one channel only, employing two indices. Only the intermediate frequency circuits (2 megacycles per second) of the receiver are shown at 183. The intermediate frequency waves are supplied to a synchronising pulse separator 184 designed to produce pulses from the gaps mentioned above in some appropriate way. The separated pulses are supplied to a gating system comprising elements 41 to 46 arranged exactly in the same way as shown in Fig. 3. The duration of the gating pulses produced by the generators 43 and 44 should preferably be somewhat less than 4 microseconds and they should be timed by means of the delay networks 41 and 42 to select the central portions of the corresponding groups of phase modulated waves. These groups are passed through relatively narrow band filters 185 and 186 tuned to 2 megacycles per second, to corresponding frequency changing modulators 187 and 188. These modulators are also respectively supplied with waves at 450 and 500 kilocycles per second by the arrangement of elements 189 to 192. A harmonic generator 189 is connected to the output of the synchronising pulse selector 184. The fifth harmonic (50 kilocycles) of the synchronising pulse repetition frequency (10 kilocycles) is selected by the band pass filter 190 and is supplied to two frequency multipliers 191 and 192 multiplying respectively by 9 and 10, and connected respectively to the modulators 187 and 188. Alternatively, the harmonic generator 189 could be omitted, and the filter 190 could be replaced by an oscillator (not shown) generating a frequency of 50 kilocycles per second.

The lower sidebands at 1.55 and 1.50 megacycles per second are respectively selected from the modulators 187 and 188 by the band pass filters 193 and 194, and are respectively supplied to a second pair of frequency changing modulators 195 and 196 also supplied from the filters 185 and 186. The lower sidebands at frequencies 450 and 500 kilocycles per second are respectively selected by the filters 197 and 198.

The arrangement will be seen to be similar to that of Fig. 12, and as in the case of that figure, the filters 193 and 194 should be designed to introduce a delay of 100 microseconds.

As in the case of Fig. 11, pulse combs are produced from the phase modulated wave packets at the outputs of the filters 197 and 198 by means of the pulse generators 199 and 200, a phase shifter 201 being interposed between elements 198 and 200 to enable the two combs to be relatively timed to produce the coincidence near the centre of each comb. The two combs are applied to a coincidence circuit 202 and demodulated by a suitable demodulator 203 as before.

As in the case of Fig. 12, if the demodulator shown in Fig. 4 is used, two integrating circuits should be used.

When three or more indices are used, the left-hand chain of elements 41 to 199 in Fig. 14 should be duplicated for each additional index. In the case of the three-index system suggested above, an additional frequency multiplier (not shown) corresponding to 191 and multiplying by 11, would be needed to supply the modulator (not shown) corresponding to 187, and the filter (also not shown) corresponding to 193 would be designed to select the lower sideband at 1.45 megacycles, introducing at the same time a delay of 100 microseconds. The filter (not shown) corresponding to 197 should then select the sideband at 550 kilocycles. The three pulse combs subsequently produced in the manner already explained will then be applied to the element 55 which in this case should be a triple coincidence circuit as previously described. By the use of this system of frequency changes, the envelope time shifts are equalised, as required.

It should be pointed out with regard to the arrangements of Figs. 10 to 14, that if the phase modulator 8 (Figs. 10 and 13) be supplied with a signal wave which has been passed through an integrating network, the system is effectively converted into a frequency modulation system instead of a phase modulation system. The advantage is that the permissible phase deviation for low signal frequencies may thereby be increased without the introduction of ambiguity. If this is done, the integrating circuit 68 is not required when the receiver of Fig. 11 is used, but one integrating circuit instead of two should be supplied when the receiver of Figs. 12 or 14 is used.

In this third embodiment which has just been described, the indices are identified with the phases of the corresponding wave packets. In the receiver described with reference to Fig. 11, the phase of each wave packet is ultimately referred to a standard of phase which is really set by the master oscillator 1 (Fig. 10), though the phase comparison is effected indirectly. However, in the receivers of Figs. 13 and 14, there is a direct comparison of the phase of each packet with the phase of the preceding packet. In these cases, therefore, the "standard" of phase for each wave packet is the phase of the preceding wave packet. In the case of the Fig. 11 receiver, a substantially direct comparison between the phase of each wave packet and the phase standard set by the master oscillator could evidently be made by various means.

Likewise, if in Fig. 13, the generator 182 is designed to produce synchronising packets of unmodulated waves of the same frequency as the transmitted index wave packets, the phase of each received index packet may be compared with the phase of the synchronising packet, instead of with the phase of the preceding index packet, by means of arrangements very similar to those shown in Fig. 14.

The fourth embodiment of the invention consists of a pulsed frequency modulation system in which the amplitude of each signal sample is characterised by two indices as before. One of these indices is obtained from a phase comparison and is the ambiguous index, while the second index by means of which the ambiguity is resolved is the frequency, which is unambiguous.

In the pulsed frequency modulation system as hitherto practiced, the signal wave is applied to frequency modulate an oscillator, and the frequency modulated waves are then passed through a gate circuit which only allows very short pulses of the frequency modulated waves to pass. In this case the instantaneous frequency of the waves constituting each pulse represents unambiguously the amplitude of the corresponding sample of the signal wave, and is utilised in the receiver to reproduce the signal wave. There is also a definite relation between the relative phase of the waves in successive pulses and the variations of the signal amplitude. Since in the period between two pulses the frequency of the oscillator is continuously changing in accordance with the changes in the signal amplitude, the phase change which occurs in this period is proportional to the time integral of the signal amplitude over this period.

If therefore an attempt is made to utilise the phase change as an ambiguous index in this system, distortion will be introduced because the other index namely the frequency, which would be used to resolve the ambiguity, represents a different function of the signal wave, namely the amplitude at a particular instant. In certain special cases the distortion introduced by this process may not be excessive, and in the specification of co-pending application of the same inventor, Serial No. 257,809, filed November 23, 1951, a receiver is disclosed and claimed for making use of these two indices which are available in the conventional system.

According to the present invention, however, the transmitting arrangements of the pulsed frequency modulation system are modified in such manner that both the frequency and the phase of the waves constituting each pulse can be utilised to represent the same function (namely the amplitude) of the same sample of the signal wave. The use of the two indices at the receiver in the same way as in the previous embodiments then enables the signal amplitude samples to be reproduced without distortion.

When the conventional pulsed frequency modulation system is applied to multichannel working, it is usual to gate each signal wave, and to apply amplitude samples of the various signal waves in turn to frequency modulate an oscillator common to all channels. If this is done, then the phase of the waves constituting any transmitted pulse has no unique relation to the corresponding signal wave, since this phase depends on the frequencies corresponding to all the other channel samples. In this case the phase cannot be used at all as an ambiguous index. For this to be possible it is necessary that a separate oscillator be provided for each channel, and then an index can be derived from the phase to characterise the signal wave.

It follows, therefore, that in a multichannel system according to the present invention, a separate oscillator will be used for each channel.

It ought to be made clear at this point, in the case of the present embodiment, that in contrast to the first three embodiments already described, while the indices which characterise each signal sample are produced at the transmitter, they are not actually separately transmitted, but are extracted at the receiver from the transmitted signal pulses. Thus, corresponding to each signal sample there is transmitted only one signal, namely a wave pulse, but this wave pulse has been produced according to the invention in such manner that at the receiver it is possible to derive from the received wave pulses two different indices both representing the same signal sample, at least one of which indices is ambiguous. As will appear from the following description, at least one of the indices is always obtained by utilising a pair of successive wave pulses.

Fig. 15 shows in block schematic form a transmitter circuit for a single channel of a 12 channel pulsed frequency modulation system as modified according to the present invention. A master oscillator 204 generates the sampling frequency of 10 kilocycles per second, as before, and supplies waves through a phase shifter 205 to a gating pulse generator 206 which generates positive gating pulses of duration 8 microseconds. These pulses are supplied over conductor 207 to a gating circuit 208 to which the frequency modulated waves are also applied, as will be explained later. The gating pulses from the generator 206 are also passed through an inverting amplifier 209 to a differentiating circuit 210 which produces short negative and positive differentiated pulses corresponding respectively to the leading and trailing edges of the gating pulses. The differentiating circuit will be assumed to include conventional means for eliminating the negative pulses, which are not required.

The positive pulses are applied through a delay network 211, which introduces a delay of about 1 microsecond, to a conventional pulse amplitude modulator 212 to which the signal wave is applied at terminals 213 and 214. The amplitude modulated pulses produced by the modulator 212 are applied to a storage circuit 215, the nature of which will be explained later.

The positive differential pulses from the differentiating circuit 210 are also applied directly to the storage circuit 215 over a conductor 216. The storage circuit 215 is followed by a low pass filter 217, at the output of which stepped rectangular waves are produced, the amplitude after each step being proportional to the amplitude of a corresponding sample of the signal wave. These stepped waves are applied to frequency modulate by conventional means an oscillator 218 generating waves of a frequency suitable for radiation. The frequency modulated waves from the output of the oscillator 218 are gated by the gating circuit 208, and corresponding pulses of frequency modulated waves are delivered to the output conductor 219 and thence to the radio transmitter (not shown).

The elements 205 to 218 are duplicated for each channel of the system, the duplicated apparatus for each channel being connected between the output of the master oscillator 204 and the conductor 219.

The phase shifters 205 of the various channels should be adjusted to align the corresponding gating pulses side-by-side in the sampling period, and will occupy 96 microseconds thereof, leaving a 4 microseconds gap which can be used as the synchronising signal as already explained above.

Fig. 16 shows details of the storage circuit 215 of Fig. 15. A valve 220 is arranged as a cathode follower with its anode connected to the positive high tension terminal 221, and its cathode connected to the grounded negative high tension terminal 222 through a storage capacitor 223. A discharging valve 224 having a cathode bias network 225 is connected across the storage capacitor 223. This valve should be biassed beyond the cut-off. The positive amplitude modulated pulses from the modulator 212 (Fig. 15) are applied through the input terminal 226 to the control grid of valve 220, and the undelayed positive pulses from the differentiating circuit 210 are applied through the input terminal 227 to the control grid of the discharging valve 224. The anode of this valve is connected to a terminal 228 from which the output wave is obtained and is applied through the filter 217 (Fig. 15) to the oscillator 218.

The circuit operates in the following way. A short pulse applied at terminal 227 first unblocks the valve 224 and discharges the storage capacitor 223. About one microsecond afterwards an amplitude modulated pulse arrives at terminal 226 and charges the capacitor 223 positively to a potential proportional to the amplitude of the pulse. The capacitor 223 then holds its charge for 99 microseconds until the next discharging pulse arrives at terminal 227. One microsecond later it is recharged to a potential proportional to the next amplitude modulated pulse, and so on. The wave obtained at the output terminal 228 therefore has the form shown in Fig. 17, graph B, consisting of long rectangular pulses separated by very short gaps which are removed by the filter 217 in order to produce the stepped rectangular wave.

In Fig. 17, graph A represents to a horizontal time scale the gating pulses of 8 microseconds duration produced by the gating pulse generator 206 of Fig. 15. These pulses are repeated at intervals of 100 microseconds. Graph B shows the corresponding variations in the potential of the storage capacitor 223 (Fig. 16) to the same time scale. When the trailing edge of the gating pulse 229 arrives, the storage capacitor is immediately discharged, as indicated at 230, and 1 microsecond later is charged to the potential 231 corresponding to the amplitude modulated pulse, which is delayed by this amount after the trailing edge of the gating pulse. When the next gating pulse 232 arrives, the capacitor is again discharged at 233 and is then recharged to a new value 234, and so on. It will be clear that graph B also represents the variation in frequency of the oscillator 218 (Fig. 15) except for the 1 microsecond gaps which are removed by the filter 217. Thus it will be seen that the frequency of the oscillator remains constant substantially for the whole of the 100 microsecond period between the trailing edges of successive gating pulses, there being practically a sudden change at each trailing edge.

Graph C in Fig. 17 shows to the same time scale the phase of the waves generated by the oscillator 218 with reference to the phase of waves having the mean frequency. It is assumed that previous to the gating pulse 229 the oscillator frequency has the mean value, in which case the phase has the zero or reference value, as indicated by the portion 235 of the curve. After the occurrence of the trailing edge of the pulse 229 (graph A), the frequency suddenly changes to the higher value represented by 231, and the phase then starts to advance steadily as indicated by the inclined straight line 236. On the occurrence of the pulse 232 there is a further increase in frequency as indicated by 234, and the phase then advances more rapidly, as indicated by the steeper straight line 237. It will be evident that since the frequency of the oscillator is held constant between gating pulses, measurement of the phase change during any interval lying between the trailing edges of gating pulses 229 and 232 will give a measure of the amplitude of the signal sample which frequency modulates the oscillator 218 (Fig. 15) to the frequency indicated on graph B by the line 231. If this interval is so short that the phase change is less than 180°, an unambiguous measurement of coarse accuracy is obtained, while if the interval is long, for example extending over the whole of a sampling period, so that the phase change embraces several cycles, a measurement of higher inherent accuracy is obtainable, but is ambiguous. It will therefore, be appreciated that if the frequency characterising the wave pulse passed by the gating pulse (232, for instance) is measured twice over at the receiver, once by measurement of the phase change over a short interval and again by measurement of the phase change over a relatively long interval (covering several cycles), two indices representing the signal amplitude at the time of the trailing edge of the gating pulse 229 will be obtained, and can be used to reconstitute the signal amplitude according to the principles already explained.

One form of a receiver for this system is shown in Fig. 18. The arrangement is the same as Fig. 14 with the addition of a further frequency changing stage, and the elements which are similar to those of Fig. 14 have been given the same designation numbers. The only other difference lies in the choice of frequencies, and in the duration of the gating pulses. The first or unambiguous index is the frequency of each wave pulse, and this is measured in the circuit of Fig. 18 by comparing the phases of two samples of the wave pulse spaced apart in time by 4 microseconds. The ambiguous index is the phase change, and is measured by comparing the phases of two samples spaced apart by 100 microseconds and taken respectively from the ends of successive wave pulses. The subsequent process is similar to that described for the second embodiment illustrated in Figs. 7, 8 and 9 in which one of the indices is also unambiguous. In this case a comb of pulses like graph E, Fig. 9 is derived from the ambiguous index, and a comb of pulses like 122 and 123, graph F is derived from the unambiguous index for picking out the particular pulse of the other comb which represents the actual amplitude of the original sample. The extra frequency change, which corresponds to the one produced by the modulator 112 in Fig. 8, is used, as before, to equalise the envelope time shifts of the phase modulated waves.

Referring now to Fig. 18, it is assumed that the intermediate frequency circuits 183 are designed for 4 megacycles per second. The pulse generator 43 should be designed to produce gating pulses of 8 microseconds duration, and the delay network 41 should be adjusted so that the wave pulse corresponding to the channel concerned is selected by the gate circuit 45. The frequency will utimately be determined from this wave pulse.

The pulse generator 44 should be designed to produce shorter gating pulses of duration perhaps 1 microsecond. The delay network 42 should be adjusted so that the gate circuit 46 will selected a short sample from the wave pulse selected by the gate circuit 45, as near as possible to the trailing edge of the pulse. The ambiguous phase change will subsequently be determined from these short samples.

The filter 190 should be designed to select the tenth harmonic (100 kilocycles per second) from the harmonic generator 189. The frequency multipliers 191 and 192 should be designed to multiply by 24 and 25 respectively, thereby producing heterodyne waves of 2.4 and 2.5 megacycles, respectively, for the modulators 187 and 188. The filters 193 and 194 should be designed to select the lower sidebands of 1.6 and 1.5 megacycles, respectively, which are passed to the modulators 195 and 196. These modulators are also supplied with waves at 4 megacycles from the filters 185 and 186 respectively, and the filters 197 and 198 should be designed to select the lower sidebands at 2.4 and 2.5 megacycles, respectively.

The filter 193 should be designed to introduce a delay of 4 microseconds, so that the waves selected by the filter 197 will have a phase characteristic of the frequency of each wave pulse.

The filter 194 should however be designed to introduce the much longer delay of 100 microseconds, so that the phase of the waves selected by the filter 198 will be equal to the change of phase between successive wave pulses.

Since the wave pulses selected by the gating circuits are too short for the subsequent process, it is necessary to choose the bandwidth of the filters 197 and 198 sufficiently small so that they elongate the wave packets to a duration of about 50 microseconds.

The pulse generator 200 then produces pulse combs in the same way as before from the wave packets at the output of the filter 198. These pulse combs have a pulse repetition period of 0.4 microsecond, and the duration of these pulses should be very short, for example, 0.02 microsecond.

The waves at the output of the filter 197 are subjected to a further frequency change by a frequency changing modulator 241 which is also supplied with waves at a frequency of 2.5 megacycles from the multiplier 192. The lower sideband at 100 kilocycles is selected by the filter 242 and the pulse generator 199 will then produce pulses separated by a period of 10 microseconds. These pulses should be given a duration very much greater than that of the pulses of the comb produced by the generator, for example, 0.2 microsecond. It will be noted that for a given signal amplitude sample at the transmitter (Fig. 15) the phase shift produced for the waves at the output of the filter 198 will be 25 times that produced at the output of the filter 197, because the first is derived from a period of 100 microseconds, while the second is derived from a period of only 4 microseconds. Thus by means of the particular frequency change to 100 kilocycles, the envelope time shifts of the pulse combs produced by the generators 199 and 200 will have been made equal, as is necessary according to the explanation already given above.

As already mentioned, the generators 199 and 200 produce pulses which are similar to those illustrated in graphs F and E respectively (Fig. 9). The phase shifter 201 (Fig. 18) should be adjusted so that under the condition of zero modulating signal voltage, a pulse such as 124 (graph E, Fig. 9), near the centre of the comb, will be selected by the pulse 122 (graph F). The coincidence circuit 202 (Fig. 18) then produces a train of time position modulated pulses, as before; and the signal wave is recovered by the pulse demodulator 203. Since in this case the wave pulses are frequency modulated at the transmitter and since the phase of the waves at the output of the filter 198 (Fig. 18) is proportional to the frequency and therefore to the amplitude of the corresponding signal sample, the pulses at the output of the coincidence circuit 202 will have time shifts proportional to frequency; therefore if a frequency discriminator is used in the demodulator 203 it should be followed by one integrating stage in order to reproduce the signal wave. The discriminator should preferably be tuned to 100 kilocycles per second.

By the use of the values suggested above a frequency deviation of ±100 kilocycles per second for the wave pulses can be handled without ambiguity. For a frequency deviation ±100 kilocycles per second, a phase shift of ±10 cycles takes place during the period of 100 microseconds between wave packets; a phase shift of ±10 cycles at 2.5 megacycles, which is the frequency of the pulses in the comb generated by the generator 200 (Fig. 18), corresponds to a time shift of ±4 microseconds. This is within the range of the coincidence period of the two combs, which is 10 microseconds.

If the frequency deviation which can occur between any two wave pulses is small, which may be the case with certain types of signal, the circuit of Fig. 18 may be slightly simplified by eliminating the elements 42, 44, 46 and 186, and by making a direct connection indicated by the dotted line 243 between the output of the filter 185 and the inputs of the modulators 188 and 196. In this case two successive complete wave packets of duration 8 microseconds are compared by the modulator 196, instead of only a small portion of each, and this will be possible so long as the differential phase does not change appreciably during the 8 microseconds period. If there should be an appreciable change, however, the filter 198 would not pass these phase variations, and an amplitude variation at the output of this filter would result.

In the receiver shown in Fig. 18 the circuit was designed according to the conception that the two indices representing the signal wave sample are derived, respectively, from the frequency and the phase. Actually, the transmission of the signal by the method described with reference to Fig. 15 can be regarded from other points of view, and in the preferred form of receiver shown in Fig. 19 the two indices which are used to represent each signal sample are both ambiguous. The method adopted is as follows. Assuming that the wave pulses are transmitted as described with reference to Fig. 15, then at the receiver two short samples are taken, one from near the beginning, and one from near the end of each wave packet, which has a total duration of 8 microseconds. Then the first index is obtained as the phase difference between the "early" sample of each pulse and the "late" sample of the preceding pulse; and the second index is obtained as the phase difference between the "late" sample of each pulse and the "late" sample of the preceding pulse.

Referring now to Fig. 19, this will be found to be the same as Fig. 14 slightly modified, and with the addition of one element, though a different choice of values is suggested. The difference in the circuit is simply that the modulator 196 is supplied from the output of the filter 185 through a delay network 244 instead of from the output of the filter 186; thus the filter 185 supplies both the modulators 195 and 196.

It will be assumed in this case that the intermediate frequency circuits 183 are designed for a frequency of 10 megacycles per second. The gating pulse generators 43 and 44 should be designed to generate gating pulses of duration about 1 microsecond. The delay network 41 should be adjusted so that the gating circuit 45 selects a "late" sample of each 8 microsecond wave pulse corresponding to the channel concerned; for example the sample could be during the 7th microsecond of this period. The delay network 42 should likewise be adjusted so that the gating circuit 46 selects an "early" sample; for example during the 2nd microsecond of the 8 microsecond period. Two successive pairs of such samplings are shown in graph C of Fig. 17 at the times indicated by the dotted lines 245, 246, 247, 248.

The filters 185 and 186 should be designed for 10 megacycles per second and should also produce some elongation of the 1 microsecond wave samples.

The filter 190 should be arranged to select the fifth harmonic at 50 kilocycles per second from the harmonic generator 189, and the frequency multipliers 191 and 192 should be designed to multiply by 20 and 19 respectively. The filters 193 and 194 should be designed to select the lower sidebands at 9 and 9.05 megacycles per second, respectively, from the modulators 187 and 188. The filters 197 and 198 should also be designed to select the lower sidebands at 1,000 and 950 kilocycles per second respectively from the modulators 195 and 196. These filters should also elongate the wave packets to a duration of at least 20 microseconds. The pulse gnerators 199 and 200 then produce corresponding pulse combs with pulse repetition frequencies of 1000 and 950 kilocycles respectively, in which the coincidence period is 20 microseconds, and which are treated by the elements 202 and 203 as before.

The filter 193 should be designed to introduce a delay of 100 microseconds, so that the "late" sample 245 (graph C, Fig. 17) may be combined with the "late" sample 247 of the following wave pulse in the modulator 195. Then the delay network 244 should be designed to introduce a delay of 100 microseconds to delay the "late" sample 245 so that it reaches the modulator 196 at the time that the sample 247 is selected by the gating circuit 46. Then the filter 194 should be designed to introduce a delay of 5 microseconds to bring the "early" sample 248 applied to the modulator 196 into coincidence with the delayed "late" sample 245.

It will be seen that the packet of waves at the output of the modulator 195 will be phased in accordance with the phase difference between the samples 247 and 245 (graph C, Fig. 17), while the packet at the output of the modulator 196 will be phased in accordance with the phase difference between the samples 248 and 245. These packets will occur simultaneously and correspond respectively to two ambiguous indices both of which represent the frequency at the time of the trailing edge of the gating pulse 232 (graph A, Fig. 17).

By choice of the frequencies 1,000 and 950 kilocycles, which are in the same ratio as the periods separating the samplings 247 and 248 and the sampling 245, the two combs produced by the pulse generators 199 and 200 will have the same envelope time deviation.

As in the case of Fig. 18, the time shifts of the pulses produced by the coincidence circuit 202 are proportional to the frequencies of the corresponding wave pulses and therefore also to the corresponding signal amplitude. Thus if a frequency discriminator is used in the pulse demodulator 203, it should be followed by a single integrating stage. The coincidence period between the two pulse combs produced by the generators 199 and 200 being 20 microseconds, the discriminator should preferably be tuned to 50 kilocycles per second.

The fifth embodiment of the invention illustrated in Figs. 20 to 22 can be regarded as a development of the first embodiment shown in Figs. 1 to 3, and the indices are separately transmitted to the receiver by frequency modulation of a carrier wave. The basis of the present embodiment will be explained with reference to Fig. 2. Referring to graphs C and D of that figure, it will be noted that during the period between the coincidences of the pulses 29—30 and 31—32 of the two combs, there is no occasion when a pulse of one comb occurs at the same time as a pulse of the other. Thus if the same gating pulse 25 (graph A) were used to select a pulse from both the combs, two separate index pulses would always be transmitted during this single gating period, and could be used at the receiver to reproduce the channel pulse 26 in the manner already described, provided that it were known which of the two pulses is the first index pulse and which is the second, since by this process they might be transmitted in either order. There are various obvious ways in which the two index pulses might be marked so that they could be distinguished, and the simplest way is to make the first index pulse a positive pulse, and the second index pulse a negative pulse. This, however, would be generally an unsuitable plan if the index pulses are transmitted directly or by amplitude modulation, but is well adapted for transmission by frequency modulation, since positive and negative frequency deviations are readily recognised.

The advantage of this scheme is that only a single channel is required for transmitting both index pulses, and so a further gain in signal-to-noise ratio can be obtained. However it is now necessary to reduce the total time excursion of the channel pulse 26 a little, so that it is a little less than the difference between the comb coincidence period and the duration of the gating period, in order to avoid the coincidences 29—30 and 31—32, which could not be transmitted. There will however be some overall improvement in signal-to-noise ratio over what can be obtained by means of the first embodiment. Stated in another way, the system of this fifth embodiment enables a given frequency bandwidth to accommodate more channels than the system of the first embodiment, with the same improvement in signal-to-noise ratio on each channel for both systems.

The transmitting circuit shown in Fig. 20 has certain elements, which apart from the particular values and adjustments, are the same as elements in Fig. 1, and have been given the same designations. This system is designed for 24 channels, and the 100 microsecond period is therefore divided into 24 channel periods of 3 microseconds each with 1 microsecond guard periods between, leaving a synchronising period of 4 microseconds during which a synchronising pulse of 2 microseconds duration is transmitted. This means that the pulse repetition period of each comb should be a little less than 3 microseconds. In this case pulse frequencies of 350 and 400 kilocycles per second will be chosen for the two combs.

Fig. 20 shows apparatus particular to one channel, and also apparatus common to all channels. The individual channel apparatus comprises the phase modulator 8, which is connected to a frequency multiplier 249 which multiplies by 5, and which is in turn connected to two further frequency multipliers 250 and 251 multiplying respectively by 7 and 8. The multiplier 250 is connected through a phase shifter 251′ to the pulse generator 18 which produces the first index comb in the manner already described, while the multiplier 251 is connected directly to the pulse generator 19 which produces the second index comb. These combs are supplied to the gating circuits 20 and 22, which are opened simultaneously by the same gating pulses of duration 3 microseconds produced by the gating pulse generator 12 as before. The second gating pulse generator 13 shown in Fig. 1 is of course not needed.

The remaining apparatus shown in Fig. 20 is common to all channels. It consists of two combining circuits 252 and 253 corresponding to the first and second indices, respectively, and connected in common to the gate circuits 20 and 22 respectively, of all the channels. These combining circuits can take any suitable form, but should differ in that the first index pulses, which appear at the output of circuit 252 should all be positive, while the second index pulses appearing at the output of circuit 253 should all be negative. All the index pulses, whether positive or negative, should preferably be of equal amplitude.

The positive and negative index pulses are applied to separate input terminals of a storage circuit 254, similar in some respects to the storage circuit 215 shown in Fig. 15, and shown in detail in Fig. 21. The stepped wave generated by the storage circuit is generally similar to that shown in graph C, Fig. 17, without the gaps, and is applied in conventional manner to modulate the frequency of a suitable oscillator 255, the output of which is supplied through a normally open gating circuit 256 to an output conductor 257 leading, for example, to a radio transmitter (not shown). The stepped wave will, however, have about 48 steps in the period between two synchronising pulses, corresponding to the digit pulses of all the 24 channels.

The synchronising signal is provided by a synchronising generator 258 connected to the master oscillator 1, and designed to generate a negative pulse of 2 microseconds duration every 100 microseconds, which pulse is applied to shut the gating circuit 256, thereby interrupting the frequency modulated wave for 2 microseconds during each of the 4 microsecond synchronising periods mentioned above.

It will be understood that all the elements shown in Fig. 20 except elements 1 and 252 to 258 (inclusive) will be duplicated for each channel and will be connected in the same way between conductor 2 and conductors 259 and 260.

To make the necessary adjustments, the phase shifter 6 should first be adjusted to centre the 3 microsecond gating pulses in the 4 microsecond channel periods allotted to the channel concerned. Then the phase shifter 251′ must be adjusted to arrange the coincidence period of the two combs produced by the pulse generators 18 and 19 so as to avoid the possibility of any coinciding pulses being transmitted. By reference to graphs C and D, Fig. 2, it will be seen that this adjustment should be such that the coincidence period 29—30 to 31—32 is symmetrically placed with respect to the corresponding channel period in which, as already stated, the single gating pulse will have been centrally placed. This adjustment having been once made remains permanent, and the two combs will then be shifted in time simultaneously by the same amount as the channel pulse 26 shifts.

With the particular values suggested for this embodiment the expansion will be about 7, and the maximum alowable excursion for the channel pulse will be about ±8 microseconds.

It may be mentioned that the frequency multipliers 249, 250 and 251, could be replaced by a system of blocked valves and shock-excited resonant circuits similar to those described with reference to Fig. 1.

Fig. 21 shows details of the storage circuit 254. It comprises two valves 261 and 262 corresponding respectively to the positive and negative index pulses. The valve 261 is biased below cut-off by the resistances 263 and 264 connected in series between the high tension terminals 265 and 266, the junction point of the resistances being connected to the cathode. The control grid of the valve 262 is biased positively by connection to the junction point of the resistances 267 and 268 also connected between terminals 265 and 266, so that this valve is near saturation.

A storage capacitor 269 is connected between an output terminal 270 and ground, and this terminal is also connected to the anodes of the valves through capacitors 271 and 272 and rectifiers 273 and 274 in the manner indicated. The junction point of elements 271 and 273 is connected to terminal 265 through a third rectifier 275, and the junction point of elements 272 and 274 is connected to ground through a fourth rectifier 276. Input terminals 277 and 278 for the positive and negative index pulses, respectively, are connected through blocking capacitors 279 and 280 to the control grids of the valves 261 and 262. The outputs of the combining circuits 252 and 253 (Fig. 20) should be connected respectively to terminals 277 and 278. The terminal 270 should be connected to the oscillator 255 (Fig. 20). The four rectifiers should be directed as shown, so that they are all biased to the high resistance condition by the high tension source.

After the circuit has been in operation for a few seconds, the storage capacitor 269 will have become charged to a potential about half that of the high tension source. Suppose that a positive index pulse now arrives at terminal 277. The valve 261 will be momentarily unblocked and a negative output pulse will be obtained from the anode. The negative-going leading edge partially discharges the storage condenser through the rectifier 273, but the positive-going trailing edge is short-circuited by the rectifier 275. The potential of the capacitor 269 is thereby suddenly decreased by one step. The following negative index pulse arriving at terminal 278 will block the valve 262, and the positive-going leading edge of the anode pulse will recharge the capacitor 269 so that it assumes its original potential, and the negative-going trailing edge will be short circuited by the rectifier 276. A succession of positive and negative index pulses will cause the potential of the capacitor 269 alternately to decrease and increase. Sometimes, however, two positive or two negative index pulses may arrive in succession, in which case the potential of the capacitor 269 will change twice in the same direction. The wave obtained from the terminal 270 will therefore be a stepped rectangular wave, and each vertical edge of a step indicates a positive or a negative index pulse according as it corresponds to a decrease or to an increase of potential of the capacitor 269.

It will be noted that since the gating pulses are a little longer than the pulse period of either pulse comb, occasionally three pulses will be selected, either the first or the second index pulse being duplicated. The duplicated pulse can, however, be eliminated in the gating circuit as already explained, or alternatively the receiver can be arranged so that the duplicated pulse has no undesirable effect.

Generally, of course, the number of positive index pulses received by the circuit of Fig. 21 will be equal to the number of negative index pulses over a long period. It can be easily shown that when the potential of the storage capacitor 269 is approximately equal to half the high tension voltage, the change in charge produced by a positive pulse applied at terminal 277 is equal to the change in charge produced by a negative pulse applied at terminal 278; and also that when the potential of the storage capacitor 269 is appreciably higher (or lower) than half the high tension voltage, the changes due to negative pulses are greater (or less) than the changes produced by positive pulses. Thus the mean potential of the capacitor 269 tends always to return to half the high tension voltage; the circuit is therefore self adjusting, and the storage capacitor 269 will charge up to half the high tension voltage within a few seconds of the commencement of operation.

The receiver for this system is shown in Fig. 22, which includes a number of elements similar to elements in Fig. 3. In Fig. 22, the intermediate frequency circuits of the radio receiver are indicated at 281. The frequency modulated waves at the output of 281 are demodulated by a suitable frequency discriminator 282 to recover the stepped wave originally produced by the storage circuit 254 of Fig. 20. This wave is applied to a differentiating circuit 283 which will produce a short negative differential pulse corresponding to each of the first index pulses, and a short positive differential pulse corresponding to each of the second index pulses. The output from the differentiating circuit 283 is therefore applied direct to the gating circuit 46, and through an inverting amplifier 284 to the gating circuit 45. Assuming that the gating circuits are arranged in the manner explained with reference to Fig. 6, then negative pulses have no effect, and it will be clear that the first index pulses will be selected by the gating circuit 45, and that the second index pulses will be selected by the gating circuit 46.

Since now both gating circuits must be opened simultaneously by the same gating pulses, elements 41 and 43 of Fig. 3 are not required, and the generator 44 therefore supplies 3 microsecond gating pulses to both gating circuits.

The gating pulses are derived from a synchronising selector 285 which rectifies the frequency modulated wave, and derives therefrom pulses from the synchronising gaps produced by the gating circuit 256 (Fig. 20). These pulses are employed in the pulse generator 44 to produce the desired gating pulses in any suitable way.

The elements following the gating circuits 45 and 46 are the same as in Fig. 3 and operate in exactly the same way, and it is therefore not considered necessary to explain it all again. The resonant circuits 49 and 50 should in this case be tuned respectively to 350 and 400 kilocycles per second.

In Fig. 22, elements 281 to 285 are common to all channels, and the remaining elements are duplicated for each channel, and will be connected to conductors 286, 287 and 288 in the same way.

It should be pointed out that by a slight modification of the adjustments of the transmitting circuit (Fig. 20) the limitation of the time excursion of the channel pulse can be avoided so that the system becomes entirely equivalent to that of Figs. 1 to 3. Referring to Fig. 2, graphs C and D, it is to be noted that the difference between the pulse repetition periods of the two combs is 0.2 microsecond. If therefore the comb pulses be given a very short duration of, say, 0.05 microsecond, and the phase shifter 251 (Fig. 20) be adjusted so that the initial pulse 29 (graph C, Fig. 2) is 0.1 microsecond later than the initial pulse 30, no pulse of one comb can coincide with any pulse of the other comb, however many pulses there are in the combs. It has already been explained that the combs shift along the time axis with the channel pulse 26 without any relative time shift, and so two index pulses, one selected from each comb, can never coincide in time. Thus the limitation caused by the coincidences of the two combs disappears. The necessary adjustment of the relative timing of the combs and the receiver will of course take account of the special adjustment at the transmitter.

In the various embodiments described above to illustrate several applications of the principles of the invention, a variety of different numerical values have been assumed as examples. These assumed values are not in any sense essential, and other suitable series of values could be used in any of the embodiments, according to the requirements which have to be satisfied.

It should be mentioned that although quantising of the signal amplitudes is neither required nor employed in the embodiments of the present invention, it appears to be held in some circles that quantising has substantial advantages in itself, apart from the necessity for its use in a code modulation system. It is obvious that, if desired, the embodiments of the present invention may be used to transmit a signal wave after it has been quantised by any conventional process. However it does not seem that the possible advantage of quantising would be worth the additional complication and signal distortion produced thereby.

While the principles of the invention have been described above in connection with specific embodiments, and particular modifications thereof, it is to be clearly understood that this description is made only by way of example and not as a limitation on the scope of the invention.

What I claim is:

1. An electric communication system comprising means at a transmitter for generating a train of short electric primary pulses which are time position modulated in accordance with a given signal wave, and which have a relatively large maximum time excursion, means for deriving from each of the said primary pulses a plurality of time-position modulated index pulses each of which has a relatively small maximum time excursion, the time position of at least one of the index pulses representing the time position of the primary pulse ambiguously, and means for transmitting the index pulses over a communication medium to a receiver, and at the receiver, means controlled by all the received pulses for producing a train of time position modulated secondary pulses representing the signal wave unambiguously, and having a maximum time excursion substantially the same as that of the train of primary pulses, and means for recovering the signal wave from the secondary pulses.

2. An electric pulse modulation system comprising means for producing a train of regularly repeated channel pulses which are position modulated unambiguously in accordance with the samples of the corresponding signal wave, means for producing in response to each channel pulse a group of at least two index pulses, comprising means for producing a plurality of combs of pulses each comprising a limited number of pulses with a repetition period different for each comb and less than the maximum time excursion of the channel pulse, all combs having the same time shift as the channel pulse, and means for selecting a pulse from each comb to serve as one of the index pulses of the group.

3. A system according to claim 2 in which the means for producing the channel pulses comprises a master oscillator generating wave having a frequency equal to the repetition frequency of the channel pulses, means for modulating the phase of the said waves in accordance with the signal wave, means for limiting the phase modulated waves in order to produce rectangular waves, and means for differentiating the rectangular waves.

4. A system according to claim 2 in which the transmitter is arranged to transmit signals to a receiver comprising means controlled by all the index pulses of each group for producing a train of output pulses the time position of each of which represents the corresponding signal sample unambiguously, the range of time excursion of the output pulses being greater than the range of time excursion of any of the index pulses, and means for recovering the modulating signal wave from the output pulses.

5. A system according to claim 4, in which the means at the receiver for producing the output pulses comprises means for producing in response to each received index pulse a phase modulated index train of waves, and means for utilizing all the index trains of waves for producing each output pulse.

6. A system according to claim 2 comprising means for rendering the index pulses of each group distinguishable from one another, means for transmitting all the pulses of each group during the same period of time, and means for ensuring that no index pulses occur simultaneously.

7. In an electric communication system, means for coding a signal wave for transmission comprising means for periodically sampling a signal wave, means for deriving from each sample a first index representative of the value of said sample in terms of a first scale, means for deriving from said sample a second index representative of the same value of said same sample in terms of a second scale, said second index being different from but related to said first index whereby said sample may be reconstructed from said two indices, and means for transmitting said indices.

8. In an electric communication system, means for coding a signal wave for transmission comprising means for periodically sampling a signal wave, means for deriving from each sample a primary signal element representative of a characteristic of the sample, means for deriving from each signal element a first index representative of the value of said signal element in terms of a first scale, means for deriving from said signal element a second index representative of the same value of said same signal element in terms of a second scale, said second index being different from but related to said first index whereby said sample may be reconstructed from said two indices, and means for transmitting said indices.

9. A system according to claim 8 in which the means for deriving said first index and said second index are means for producing pulses each of which is time position modulated to represent the corresponding sample.

10. A system according to claim 8 in which the means for deriving said first index and said second index are means for producing pulses whose duration is short compared with the duration of the sampling period.

11. An electric communication system comprising means for coding a signal wave for transmission comprising means for periodically sampling a signal wave, means for deriving from each sample a first index representative of the value of said sample in terms of a first scale, means for deriving from said sample a second index representative of the same value of said same sample in terms of a second scale, said second index being different from but related to said first index whereby said sample may be reconstructed from said two indices, means for transmitting said indices, means for receiving said indices, a decoding means, and means for applying said indices to said decoding means.

12. A system according to claim 2 wherein said means for producing a plurality of combs of pulses comprises a resonant circuit tuned to the pulse repetition period of one of said combs of pulses and means for applying channel pulses to shock excite said resonant circuit.

13. An electric communication receiver for deriving an output signal from a plurality of phase modulated waves each of which represents the same sample of a signal wave comprising means for deriving from one of said phase modulated waves a corresponding comb of pulses having a first pulse repetition frequency integrally related to the frequency of said one phase modulated wave, means for deriving from a second one of said phase modulated waves a corresponding comb of pulses having a second pulse repetition frequency different from said first repetition frequency integrally related to the frequency of said second one of said pulse modulated waves, a coincidence circuit and means for applying said combs to said circuit and means for deriving a single output pulse from said circuit in response to simultaneous application thereto of one pulse from each comb.

14. An electric communication receiver for deriving an output signal from a plurality of index signals each of which represents the same sample of a signal wave, comprising means for deriving from each of said index signals a phase modulated wave, means for deriving from one of said phase modulated waves a corresponding comb of pulses having a first pulse repetition frequency integrally related to the frequency of said one phase modulated wave, means for deriving from a second one of said phase modulated waves a corresponding comb of pulses having a second pulse repetition frequency different from said first repetition frequency integrally related to the frequency of said second one of said pulse modulated waves, a coincidence circuit, and means for applying said combs to said circuit and means for deriving a single output pulse from said circuit in response to simultaneous application thereto of one pulse from each comb.

15. An electric communication receiver for deriving an output signal from a plurality of phase modulated waves each of which represents the same sample of a signal wave and all of which have the same frequency but different envelope time shifts, comprising means for translating the frequencies of at least one of said phase modulated waves to such value that all have the same envelope time shift, means for deriving from the resultant waves corresponding combs of pulses having the same envelope time shifts, but pulse repetition frequencies integrally related to the frequency of the waves from which they are produced, a coincidence circuit, and means for applying said combs to said circuit and means for deriving a single output pulse from said circuit in response to simultaneous application thereto of one pulse from each comb.

16. A receiver for an electric pulse communication system in which a single sample of a signal wave is represented by each of two different position modulated index pulses having different maximum time excursions, comprising means for causing each index pulse to generate a phase modulated train of waves having a period proportional to the maximum time excursion of the corresponding pulse in response to each received index pulse, means for deriving from each train of waves a comb of pulses in which the period of repetition of the pulses is the same as the period of the corresponding train of waves, a coincidence circuit, means for applying each comb of pulses to said coincidence circuit, and means for deriving an output pulse from the coincidence circuit in response to the simultaneous application thereto of a pulse from each comb.

17. A receiver according to claim 16 in which one of said means to generate a phase modulated wave comprises a resonant circuit tuned to the frequency desired for the said phase modulated waves, and means to apply the corresponding index pulse to said circuit to shock excite it.

18. A receiver according to claim 16 comprising means for limiting the number of pulses in each comb so that the combs have approximately the same total duration, and means for adjusting the timing of the said combs so that when the signal sample has the mean value, two pulses, one from the center of each comb, arrive simultaneously at the coincidence circuit.

19. A receiver according to claim 13 in which the means for deriving each comb of pulses comprises means for squaring and differentiating the phase modulated waves from which the comb is to be derived.

20. A receiver according to claim 13 comprising means for recovering the signal wave from the output pulses corresponding to successive samples of the signal wave.

21. A receiver according to claim 20 in which the said means comprises means for selecting from the train of output pulses a wave having a frequency equal to the repetition frequency of the said pulses, and means for applying the selected wave to a frequency discriminator.

22. A receiver according to claim 20 in which the said means for recovering the signal wave comprises means for selecting from the train of output pulses a wave having a frequency equal to a harmonic of the repetition frequency of the said pulses, and means for applying the selected wave to a frequency discriminator.

23. A system according to claim 8 wherein said indices are transmitted as impulses further comprising a receiver for said pulses comprising resonant circuits tuned to a predetermined frequency, means for applying respective index pulses to said circuits to shock excite them to produce trains of waves each having a period proportional to the maximum time excursion of the corresponding pulses, means for deriving from each train of waves a comb of pulses in which the period of repetition of the pulses is the same as the period of the corresponding train of waves, a coincidence circuit, means for applying each comb of pulses to said coincidence circuit, and means for deriving an output pulse from the coincidence circuit in response to the simultaneous application thereto of a pulse from each comb.

References Cited in the file of this patent

UNITED STATES PATENTS

| | | |
|---|---|---|
| 2,452,547 | Chatterjea et al. | Nov. 2, 1948 |
| 2,485,591 | Grieg | Oct. 25, 1949 |
| 2,541,076 | Labin et al. | Feb. 13, 1951 |
| 2,547,001 | Grieg | Apr. 3, 1951 |